(12) United States Patent
Jaramillo et al.

(10) Patent No.: US 11,608,291 B2
(45) Date of Patent: Mar. 21, 2023

(54) MICRO-PERFORATED PANEL SYSTEMS, APPLICATIONS, AND METHODS OF MAKING MICRO-PERFORATED PANEL SYSTEMS

(71) Applicant: CORNING INCORPORATED, Corning, NY (US)

(72) Inventors: Andres Covarrubias Jaramillo, Corning, NY (US); Daniel Wayne Levesque, Jr., Avoca, NY (US); Johannes Moll, Corning, NY (US); Michael S Pambianchi, Corning, NY (US); Prashanth Abraham Vanniamparambil, Binghamton, NY (US)

(73) Assignee: CORNING INCORPORATED, Corning, NY (US)

( * ) Notice: Subject to any disclaimer, the term of this patent is extended or adjusted under 35 U.S.C. 154(b) by 960 days.

(21) Appl. No.: 16/347,323

(22) PCT Filed: Oct. 31, 2017

(86) PCT No.: PCT/US2017/059240
§ 371 (c)(1),
(2) Date: May 3, 2019

(87) PCT Pub. No.: WO2018/085249
PCT Pub. Date: May 11, 2018

(65) Prior Publication Data
US 2020/0262742 A1    Aug. 20, 2020

Related U.S. Application Data

(60) Provisional application No. 62/417,411, filed on Nov. 4, 2016.

(51) Int. Cl.
*C03C 23/00* (2006.01)
*C03B 33/02* (2006.01)
(Continued)

(52) U.S. Cl.
CPC ...... *C03C 23/0025* (2013.01); *C03B 33/0222* (2013.01); *C03C 15/00* (2013.01); *E04B 2001/8433* (2013.01); *G10K 11/162* (2013.01)

(58) Field of Classification Search
CPC .......................... G10L 21/0208; H04R 1/1083
(Continued)

(56) References Cited

U.S. PATENT DOCUMENTS

| 3,182,747 A | 5/1965 | Wilhelmi et al. |
| 4,787,296 A | 11/1988 | Huang |

(Continued)

FOREIGN PATENT DOCUMENTS

| CN | 1123043 A | 5/1996 |
| CN | 2300713 Y | 12/1998 |

(Continued)

OTHER PUBLICATIONS

Chinese Patent Application No. 201780074325, Office Action dated Jun. 3, 2021, 14 pages (English Translation Only) Chinese Patent Office.

(Continued)

*Primary Examiner* — Alexander Krzystan

(57) ABSTRACT

The described embodiments relate generally to a micro-perforated panel systems and methods for noise abatement and method of making a micro-perforated panel system. In particular, embodiments relate to glass micro-perforated panel systems and methods for their construction.

20 Claims, 30 Drawing Sheets

(51) Int. Cl.
*C03C 15/00* (2006.01)
*G10K 11/162* (2006.01)
*E04B 1/84* (2006.01)

(58) Field of Classification Search
USPC ........................................................ 381/94.1
See application file for complete search history.

(56) References Cited

U.S. PATENT DOCUMENTS

| | | | |
|---|---|---|---|
| 5,700,527 | A | 12/1997 | Fuchs et al. |
| 5,700,529 | A | 12/1997 | Kobayashi et al. |
| 5,740,649 | A | 4/1998 | Fuchs et al. |
| 5,942,736 | A | 8/1999 | Cortonesi |
| 6,120,875 | A | 9/2000 | Charles et al. |
| 6,617,002 | B2 | 9/2003 | Wood |
| 7,677,359 | B2 | 3/2010 | Vigran et al. |
| 8,950,548 | B2 | 2/2015 | Schneider et al. |
| 9,145,675 | B2 | 9/2015 | Gimpel et al. |
| 9,278,886 | B2 | 3/2016 | Boek et al. |
| 9,321,680 | B2 | 4/2016 | Chuang et al. |
| 10,077,206 | B2 | 9/2018 | Castle et al. |
| 10,293,436 | B2 | 5/2019 | Marjanovic et al. |
| 2003/0006092 | A1 | 1/2003 | D'Antonio et al. |
| 2003/0205010 | A1* | 11/2003 | Anglin .................. E04B 2/745 52/582.1 |
| 2007/0235253 | A1* | 10/2007 | Hiraku ................ G10K 11/172 181/293 |
| 2008/0047935 | A1* | 2/2008 | Schmidt .................... B26F 1/28 219/69.1 |
| 2008/0128201 | A1* | 6/2008 | Yamaguchi ............. B32B 3/266 181/286 |
| 2009/0013724 | A1 | 1/2009 | Koyo et al. |
| 2009/0277715 | A1 | 11/2009 | Scharer et al. |
| 2012/0244314 | A1* | 9/2012 | Scheibner .............. B01D 37/00 428/137 |
| 2014/0182967 | A1 | 7/2014 | Takeda et al. |
| 2014/0271134 | A1 | 9/2014 | Leroy et al. |
| 2015/0267402 | A1* | 9/2015 | Borrelli ................... C03C 15/00 216/48 |
| 2016/0102009 | A1 | 4/2016 | Boek et al. |
| 2017/0008122 | A1 | 1/2017 | Wieland et al. |
| 2018/0068868 | A1* | 3/2018 | Jaramillo ............ H01L 21/4807 |
| 2018/0328036 | A1* | 11/2018 | Kolcun ................ B32B 13/045 |
| 2018/0362780 | A1* | 12/2018 | Yin ........................ C03C 17/007 |
| 2019/0228756 | A1* | 7/2019 | Yamazoe ............... G10K 11/16 |
| 2020/0079057 | A1* | 3/2020 | Null ................... B32B 17/10788 |
| 2020/0087192 | A1* | 3/2020 | Thomas .............. C03B 33/0222 |

FOREIGN PATENT DOCUMENTS

| | | |
|---|---|---|
| CN | 2585907 Y | 11/2003 |
| CN | 1482341 A | 3/2004 |
| CN | 2627056 Y | 7/2004 |
| CN | 200961333 Y | 10/2007 |
| CN | 201297108 Y | 8/2009 |
| CN | 101634215 A | 1/2010 |
| CN | 102296715 A | 12/2011 |
| CN | 202300075 U | 7/2012 |
| CN | 202358111 U | 8/2012 |
| CN | 102839761 A | 12/2012 |
| CN | 102839783 A | 12/2012 |
| CN | 103072588 A | 5/2013 |
| CN | 103072589 A | 5/2013 |
| CN | 203047102 U | 7/2013 |
| CN | 203533844 U | 4/2014 |
| CN | 104616647 A | 5/2015 |
| CN | 204348328 U | 5/2015 |
| DE | 4437196 C1 | 3/1996 |
| DE | 19506512 C2 | 2/1997 |
| DE | 19717266 C1 | 4/1998 |
| EP | 816583 B1 | 4/2001 |
| EP | 1733380 A1 | 12/2006 |
| EP | 1842977 A1 | 10/2007 |
| EP | 1990125 A1 | 11/2008 |
| EP | 2054562 B1 | 2/2013 |
| GB | 1347270 A | 2/1974 |
| JP | 3601575 B2 | 12/2004 |
| JP | 2005273273 A | 10/2005 |
| JP | 2007262765 A | 10/2007 |
| KR | 2007063400 A | 6/2007 |
| RU | 2561389 C1 | 8/2015 |
| WO | 2005098816 A1 | 10/2005 |
| WO | 2006119964 A2 | 11/2006 |
| WO | 2013159240 A1 | 10/2013 |
| WO | 2013169788 A2 | 11/2013 |
| WO | 2015/100056 A1 | 7/2015 |
| WO | 2015/142978 A1 | 9/2015 |
| WO | 2016/201027 A2 | 12/2016 |
| WO | 2017/011296 A1 | 1/2017 |

OTHER PUBLICATIONS

Chinese Patent Application No. 201780074325.6, Office Action dated Dec. 14, 2021, 25 pages (16 pages English Translation and 9 pages of Original Copy), Chinese Patent Office.

Herrin et al; "Properties and Applications of Microperforated Panels," Sound & Vibration, vol. 6, 2011; pp. 6-9.

http://www.technature.ca/product/silk-metal-panels, "Silk Metal Panels Product Brochure"; Technature; 2018; 3 Pages.

International Search Report and Written Opinion of the International Searching Authority; PCT/US2017/059240; dated Apr. 6, 2018; 22 Pages; European Patent Office.

Invitation To Pay Additional Fees of the International Searching Authority; PCT/US2017/059240; dated Feb. 7, 2018; 16 Pages; European Patent Office.

Maa, "Potential of Micro-Perforated Panel Absorber;" Acoustical Society of America, vol. 104, pp. 2861-2866, 1998.

Michaud; "Silence is Golden: Optimizing the Acoustic Environment"; Price, 2014; pp. 1-12.

http://en.barrisol.com/microsorber.php; MICROSORBER®, "Bremen, Germany; Downloaded Jul. 12, 19; 5 Pages".

Nocke et al; "Micro-Perforated Sound Absorbers in Stretched Materials," Proceedings of Acoustics; Paper No. 92, 2011; pp. 1-5.

Putra et al; "Normal Incidence of Sound Transmission Loss From Perforated Plates With Micro and Macro Size Holes" ; Hindawi Publishing Corporation, Advances in Acoustics and Vibration; vol. 2014, Article ID 534569; 12 Pages; 2014.

Sakagami et al; "Double-Leaf Microperforated Panel Space Absorbers: a Revised Theory and Detailed Analysis," Applied Acoustics, pp. 703-709, 2009.

Sakagami et al; "Sound Absorption Characteristics of a Single Microperforated Panel Absorber Backed by a Porous Absorbent Layer," Acoustics Australia, vol. 39, pp. 95-100, 2011.

Tayong et al; "On the Variations of Acoustic Absorption Peak With Flow Velocity in Micro-Perforated Panels at High Level of Exvitation"; J. Acoust. Soc. Am. 127 (5) May 2010; pp. 2875-2882.

www.rpgeurope.com, "Clearsorber Deamp Product Catalog"; 2019; 2 Pages.

* cited by examiner

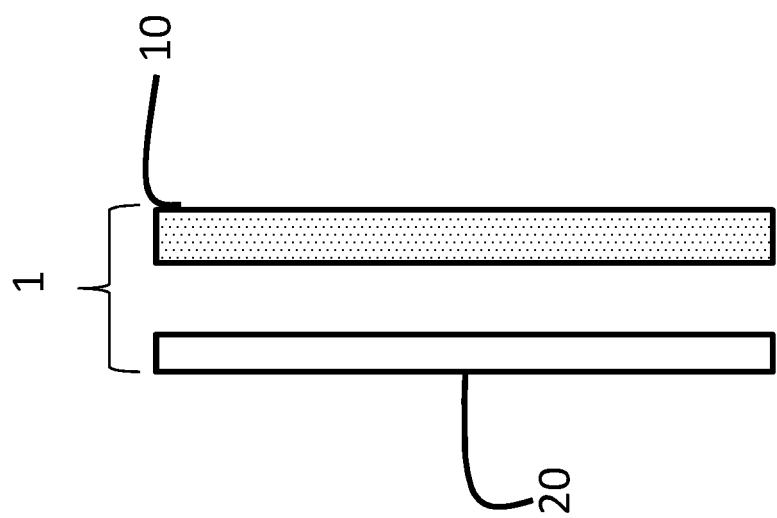

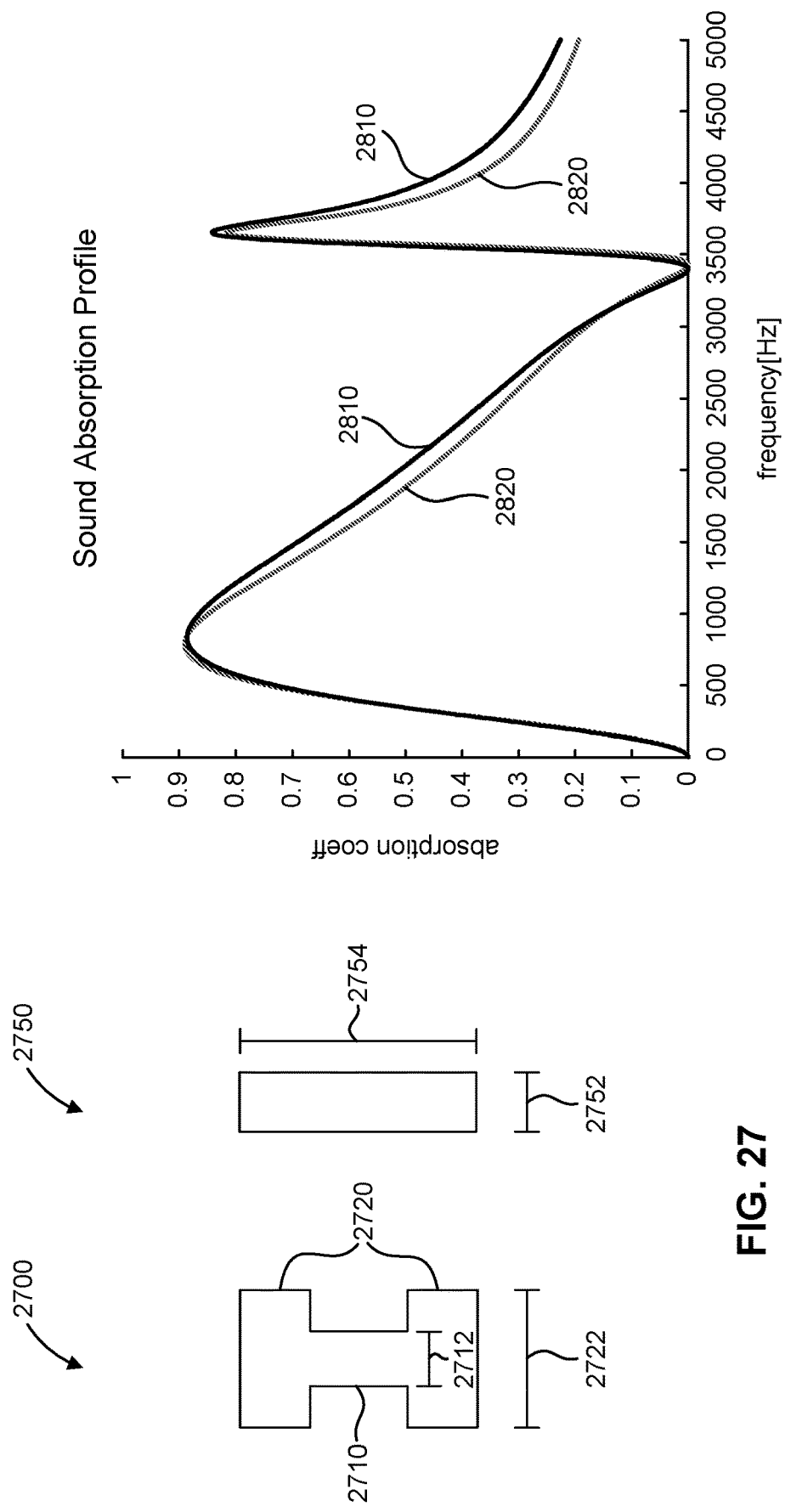

MICRO-PERFORATED PANEL SYSTEMS, APPLICATIONS, AND METHODS OF MAKING MICRO-PERFORATED PANEL SYSTEMS

CROSS-REFERENCE TO RELATED APPLICATIONS

This application is a national stage application under 35 U.S.C. § 371 of International Patent Application Serial No. PCT/US2017/059240 filed on Oct. 31, 2017, which claims the benefit of priority under 35 U.S.C. § 119 of U.S. Provisional Application Ser. No. 62/417,411 filed on Nov. 4, 2016, the contents of which are relied upon and incorporated herein by reference in their entireties.

FIELD

The described embodiments relate generally to a micro-perforated panel systems, methods for noise abatement, and methods of making micro-perforated panel systems. In particular, embodiments relate to glass micro-perforated panel systems and methods for noise abatement. The panel systems may be used with or without a solid back wall.

BACKGROUND

Glass is a highly desirable architectural product owing to its superior optical attributes, scratch and corrosion resistance, durability, waterproof, aesthetic quality, fire resistance, etc. For example, unlike polymeric materials such as polycarbonate, glass does not "yellow" over time, has high strength and scratch resistance, and may be cleaned using UV methods. However, the high density and acoustic impedance of glass leads to high acoustic reflections (e.g., echo), poor speech intelligibility, and a low noise reduction coefficient (NRC) which limits its widespread use in architectural applications particularly. Ordinary glass has nearly no sound absorption coefficient (NRC about 0.05) leading to undesirably long reverberation time and poor acoustic environment when used.

Establishing optimal room acoustics has been a growing need for many interior architectural applications including, for example, open office workspace, hospitals, classrooms, airports, automotive applications, and more. Not only can continuous exposure to sound levels greater than 85 decibels (dB) lead to hearing loss, but even noise at much lower level can be a significant distraction and lead to reduced productivity, reduced ability to concentrate or rest, and in general make a room acoustically unpleasant.

Current approaches for sound absorbing include the use of acoustic foam, fibrous materials, and other non-transparent, non-glass materials. A technical solution is required to improve acoustic properties, including NRC rating, of glass to be used in various operative environments where noise control is desirable.

SUMMARY

The present disclosure provides a micro-perforated glass or glass ceramic articles that may be used for noise abatement and acoustic control, while keeping desirable properties of glass (e.g, superior optical attributes, scratch and corrosion resistance, durability, waterproof properties, aesthetic quality, fire resistance, non-yellowing, high strength, and ability to be cleaned using UV methods, etc.). Some embodiments of present disclosure are directed to an article, including: a glass or glass ceramic panel having a thickness, wherein the panel has a plurality of micro-perforations having a diameter; and wherein the ratio of the thickness of the panel to the diameter of the micro-perforations is less than 20, or between about 0.1 and 20. In some embodiments, the thickness is between about 0.05 mm and 6 mm, between about 0.05 mm and 3 mm, between about 0.1 mm and 3 mm, or between about 0.1 mm and 0.6 mm. In one or more embodiments, the glass or glass ceramic panel extend in a plane.

In some embodiments, the panel is configured to decrease reverberation time of an operative environment.

In some embodiments, the ratio of the thickness of the panel to the diameter of the micro-perforations is between about 2 and 8, or between about 3 and 6.

In some embodiments, the panel comprises a strengthened glass or glass ceramic composition. In some embodiments, the panel includes strengthened glass or glass ceramic that is mechanically, thermally and/or chemically strengthened. In some embodiments, the panel has a Noise Reduction Coefficient (NRC) of between about 0.3 and 1, or between about 0.5 and 0.8. In some embodiments, the panel has a predetermined sound absorption coefficient over a predetermined frequency band between 250 Hz and 6000 Hz, or between 250 Hz and 20,000 Hz.

In some embodiments, a portion of an edge of the panel is sealed to a holding portion.

In some embodiments, the article further includes a backing wall operatively connected to the panel.

In some embodiments, the micro-perforations are positioned at uniform intervals along the panel. In some embodiments, the micro-perforations are distributed with uniform density along the panel. In some embodiments, the micro-perforations are positioned at non-uniform intervals along the panel. In some embodiments, the micro-perforations are distributed with non-uniform density along the panel.

In some embodiments, an opening of a plurality of micro-perforations is non-circular.

In some embodiments, the article may be thermally strengthened.

In some embodiments, the article includes first and second glass or glass ceramic panels each having a thickness, and each having a plurality of micro-perforations having a diameter. The ratio of the thickness of the panels to the diameter of the micro-perforations is less than 25, or between about 0.1 and 20, or between about 0.1 and 10.

In some embodiments, the first and second panels are spaced from each other by an intra-panel gap that defines a separation distance.

In some embodiments, the first and second panels are generally parallel to each other. In some embodiments, at least a portion of an edge of at least one of the panels is sealed to a holding portion. In one or more embodiments, the first and second glass or glass ceramic panels extend in a plane.

In some embodiments, the first and second panels are positioned such that there is no solid back wall within 1 m of the first and second panels that is generally parallel to the first panel or the second panel.

In some embodiments, the first and second panels are positioned such that there is a solid back wall within 1 m of the first and second panels that is generally parallel to the first panel or the second panel.

In some embodiments, microperforations in the first glass or glass ceramic panel are aligned with microperforations in the second glass or glass ceramic panel. In some embodiments, for at least 80% of the microperforations of the first glass or glass ceramic panel, each microperforation is positioned with respect to with a corresponding microperforation of the second glass or glass ceramic panel such that the distance between the center of the first microperforation and the center of the second microperforation is 20% or less than the diameter of the larger of the corresponding microperforations in the first and second glass or glass ceramic panels.

In some embodiments, microperforations in the first glass or glass ceramic panel are not aligned with microperforations in the second glass or glass ceramic panel. In some embodiments, for at least 80% of the microperforations of the first glass or glass ceramic panel, each microperforation is positioned with respect to a corresponding microperforation of the second glass or glass ceramic panel such that the distance between the center of the first microperforation and the center of the second microperforation is 20% or more than the diameter of the larger of the corresponding microperforations in the first and second glass or glass ceramic panels.

In some embodiments, microperforations in the first glass or glass ceramic panel are about the same size as microperforations in the second glass or glass ceramic panel. In some embodiments, for at least 80% of the microperforations of the first glass or glass ceramic panel, the diameter of each microperforation is within 10% of a first panel target diameter. For at least 80% of the microperforations of the second glass or glass ceramic panel, the diameter of each microperforation is within 10% of a second panel target diameter. The first panel target diameter is 20% or less different from the second panel target diameter.

In some embodiments, microperforations in the first glass or glass ceramic panel are different in size from microperforations in the second glass or glass ceramic panel. In some embodiments, for at least 80% of the microperforations of the first glass or glass ceramic panel, the diameter of each microperforation is within 10% of a first panel target diameter. For at least 80% of the microperforations of the second glass or glass ceramic panel, the diameter of each microperforation is within 10% of a second panel target diameter. The first panel target diameter is 20% or more different from the second panel target diameter.

In some embodiments, wherein the NRC of the article is 0.5 or greater.

In some embodiments, the porosity of microperforations in each of the first and second glass or glass ceramic panels is in the range 0% to 10%.

In some embodiments, the diameter of each of the plurality of microperforations is in the range 20 um to 500 um.

Some embodiments of the present disclosure are directed to a method of forming micro-perforations in a glass or glass ceramic panel, including: (i) forming a plurality of damage tracks into the glass or glass ceramic panel by a laser beam, wherein the panel extends in a plane and has a thickness, and wherein the damage tracks have a first diameter; and (ii) etching the panel obtained from (i) in an acid solution to form a micro-perforated panel with micro-perforations having a second diameter, wherein the NRC of the micro-perforated panel is between about 0.3 and 1. In some embodiments, the laser beam is a pulsed laser beam having a focal line oriented along a beam propagation direction and directing the laser beam focal line into the panel. In some embodiments, the method further includes, etching the glass panel in a second acid solution that is different from the first acid solution. In some embodiments, the method further includes, chemically or thermally strengthening the micro-perforated panel. In some embodiments, the glass or glass ceramic panel comprises a high-strength glass or glass ceramic composition. In some embodiments, the thickness of the glass or glass ceramic panel is between about 0.05 mm and 6 mm.

Some embodiments of the present disclosure are directed to a method of forming micro-perforations in a glass or glass ceramic panel, including: (i) forming a subset of damage tracks into the glass or glass ceramic panel by a laser beam, wherein damage tracks are positioned to form a pattern; (ii) forming plurality of damage tracks into the glass or glass ceramic panel by a laser beam, wherein the panel extends in a plane and has a thickness, and wherein the damage tracks have a first diameter; and (iii) etching the panel obtained from (ii) in an acid solution such that the subset of damage tracks merge to form a micro-perforated panel with micro-perforations having a second diameter, wherein the NRC of the micro-perforated panel is between about 0.3 and 1.

Some embodiments of the present disclosure are directed to a method of forming micro-perforations in a glass or glass ceramic panel, including: (i) forming a subset of damage tracks into the glass or glass ceramic panel by a laser beam, wherein the damage tracks are positioned to form a peripheral pattern; (ii) forming plurality of damage tracks into the glass or glass ceramic panel by a laser beam, wherein the panel extends in a plane and has a thickness, and wherein the damage tracks have a first diameter; and (iii) etching the panel obtained from (ii) in an acid solution such that the subset of damage tracks merge to remove a section of the panel and form a micro-perforated panel with micro-perforations having a second diameter, wherein the NRC of the micro-perforated panel is between about 0.3 and 1.

In some embodiments, the laser beam is a pulsed laser beam having a focal line oriented along a beam propagation direction and directing the laser beam focal line into the panel, and wherein the beam focal line is substantially perpendicular to the panel for formation of a plurality of damage tracks.

In some embodiments, spacing between adjacent damage tracks is tailored to obtain desired perforation shape or size. In some embodiments, the laser beam is a pulsed laser beam, the pulsed laser beam being configured to strike a location on the panel one or more times.

Some embodiments of the present disclosure are directed to a method of dampening sound, comprising: positioning an article comprising first and second glass or glass ceramic panels, such that there is no solid back wall within 12 inches of the first and second panels that is generally parallel to the first panel or the second panel. Each of the first and second glass or glass ceramic panels: extend in a plane; comprise a thickness; and comprise a plurality of micro-perforations having a diameter. The ratio of the thickness of the panels to the diameter of the micro-perforations is less than 25, or between about 0.1 and 20.

BRIEF DESCRIPTION OF THE DRAWINGS

The disclosure will be readily understood by the following detailed description in conjunction with the accompanying drawings, wherein like reference numerals designate like structural elements, and in which:

FIG. 1C shows a side view of the article shown in FIG. 1A with a backing wall, arranged according to an embodiment.

FIG. 27 shows an hourglass hole geometry and a cylindrical hole geometry.

FIG. 28 shows sound absorption profiles for an hourglass hole geometry and a cylindrical hole geometry.

DETAILED DESCRIPTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

The present invention(s) are described below with reference to the figures.

However, those skilled in the art will readily appreciate that the detailed description given herein with respect to these figures is for explanatory purposes only and should not be construed as limiting. As used herein, ranges are inclusive of the end points, and "from," "between," "to," "and," as well as other associated language includes the end points of the ranges. As used herein, "approximately" or "about" may be taken to mean within 10% of the recited value, inclusive.

Figure 10:
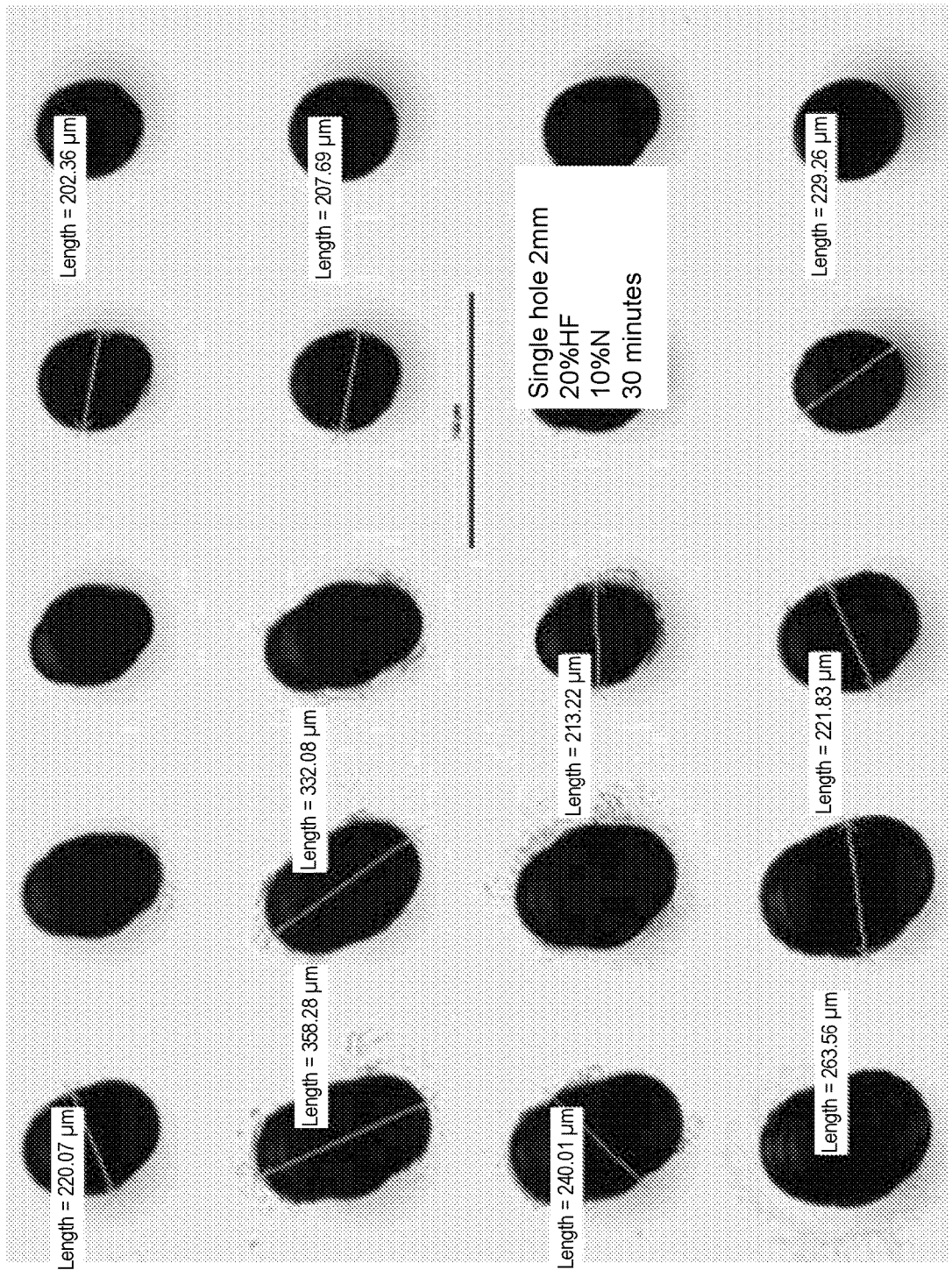
FIG. 10 shows a partial close up view of micro-perforations according to an embodiment.
Figure 11:
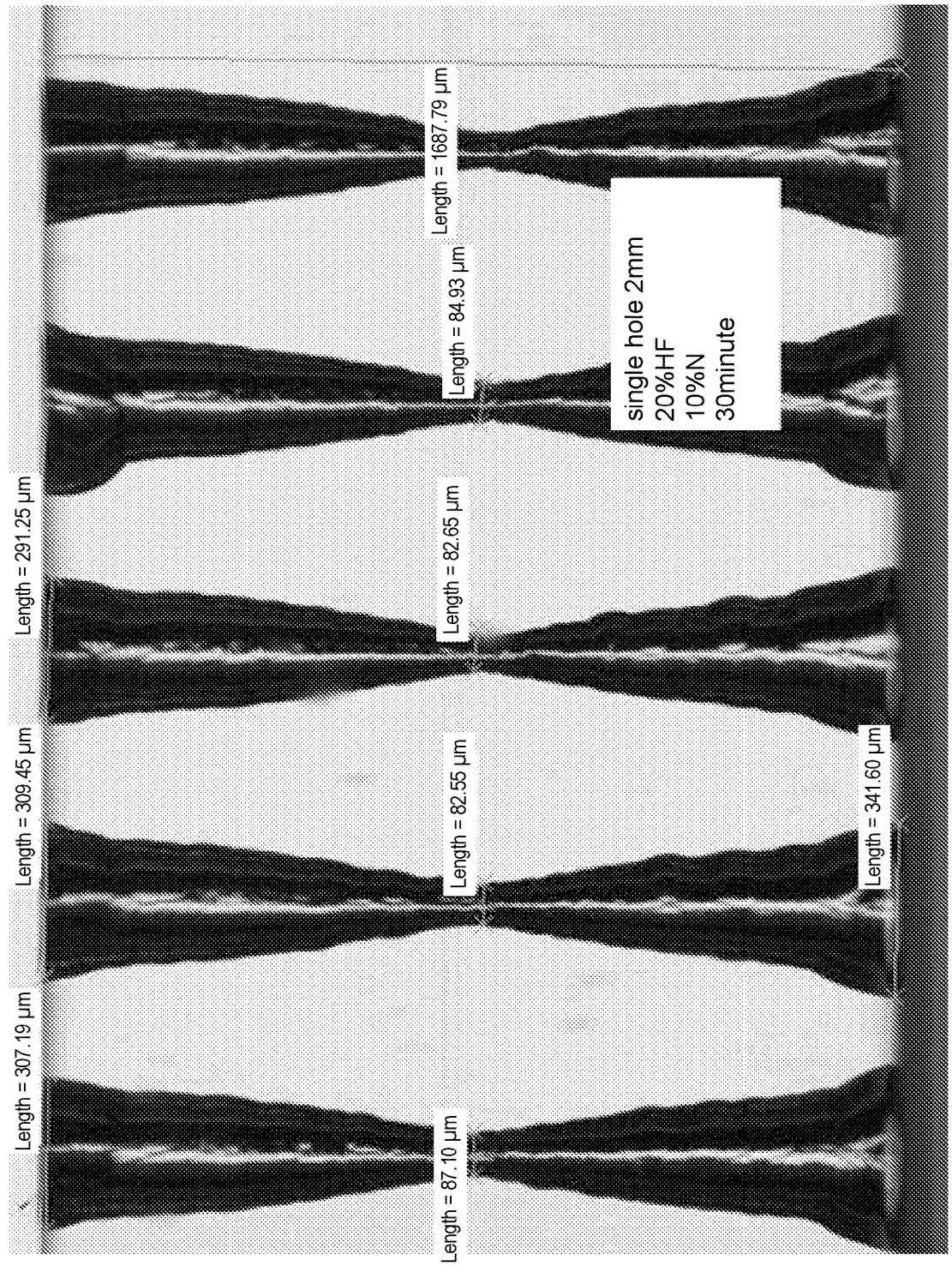
FIG. 11 shows a cross sectional view of micro-perforations according to an embodiment.

As used herein, the term "micro-perforations" may include circular and/or non-circular shaped micro-holes. The term "non-circular" may include any arbitrary shape that is not circular. The term "diameter" may be taken to mean the minimum distance across an opening of the micro-perforation at a point through the centroid of the micro-perforation, where the centroid and diameter are based on the area of the micro-perforation on a surface of the panel in which the micro-perforation is present. For example, when the micro-perforations are substantially circularly cylindrical, the diameter is the distance across the center of the circle defining the opening. Additionally, as shown in FIGS. 10 and 11, the openings of the micro-perforations may be non-circular such that the micro-perforation is not circularly cylindrical. In these cases, the "diameter" may be taken to mean the minimum distance across the non-circular opening of the micro-perforation that crosses through the centroid. The terms "hole" and "microperforation" are used interchangeably.

As used herein, "generally parallel" planes refers to two planes having surface normals that form an angle of 10 degrees or less.

Addressing room acoustics is challenging as it involves both architectural design and engineering in addition to acoustic science and principles. Micro-perforated panels in general may form a resonant sound absorbing system, based on the Helmholtz resonance principle.

Figures 1A, 1B:
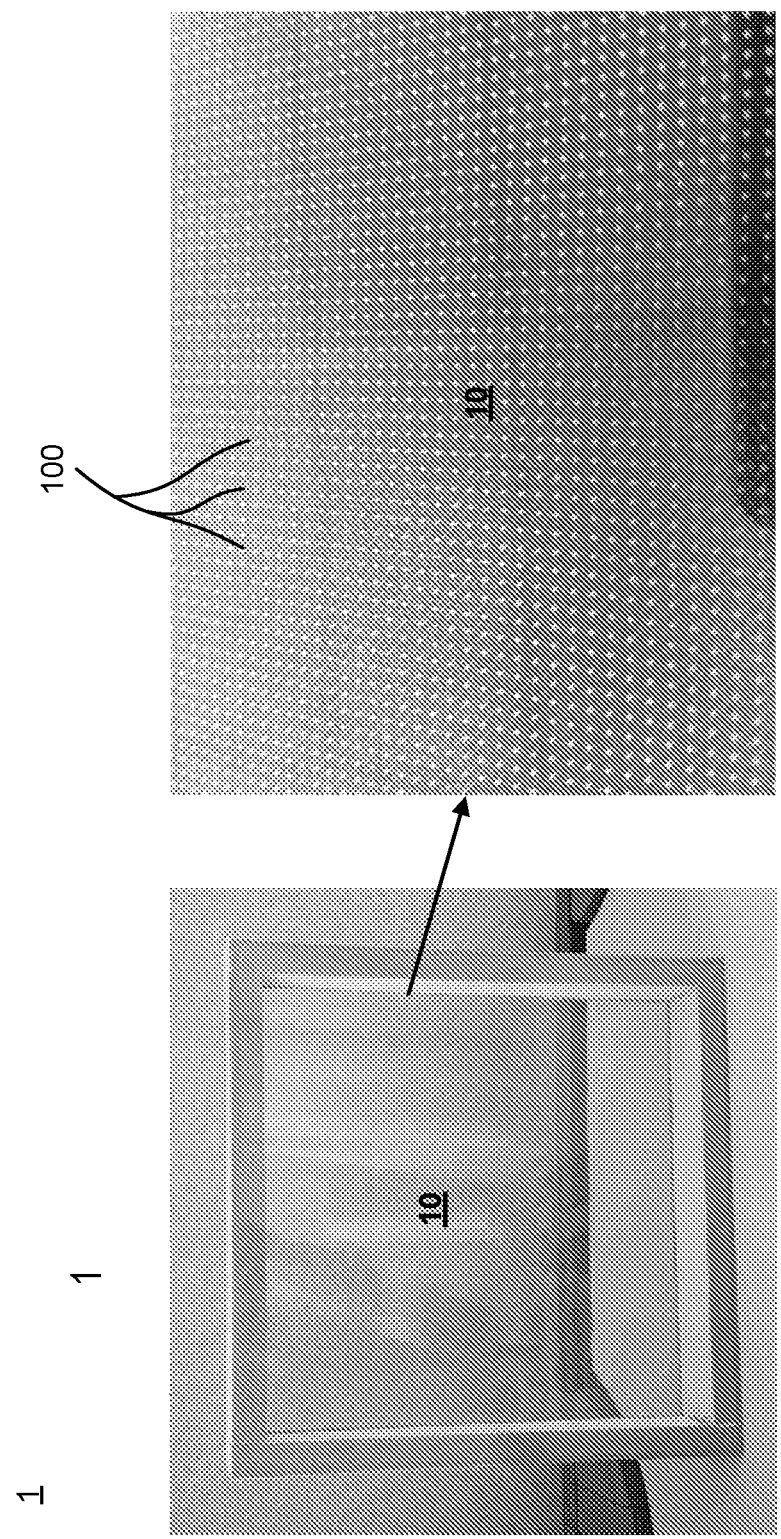
FIG. 1A shows an article according to an embodiment.
FIG. 1B shows a close-up view of micro-perforations in the article shown in FIG. 1A.

As shown in FIGS. 1A and 1B, for example, some embodiments of present disclosure are directed to an article 1, including: a glass or glass ceramic panel 10 having a thickness, wherein the panel has a plurality of micro-perforations 100 having a diameter; and wherein the ratio of the thickness of the panel 10 to the diameter of the micro-perforations 100 is less than 25, or less than 20. In some embodiments, the ratio of the thickness of the panel 10 to the diameter of the micro-perforations 100 is between about 0.1 and 20, between about 1 and 20, between about 1 and 15, between about 1 and 10, between 1 and 5, between about 5 and 20, between about 5 and 15, between about 5 and 10, between about 10 and 20, or between about 10 and 15, or about 1, 2, 3, 4, 5, 6, 7, 8, 9, 10, 11, 12, 13, 14, 15, 16, 17, 18, 19, 20, 21, 22, 23, 24, 25, or any range having any two of these values as endpoints. In some embodiments, the ratio of the thickness of the panel to the diameter of the micro-perforations is between about 2 and 8, or between about 3 and 6.

In some embodiments, the thickness is between about 0.05 mm and 6 mm, between about 0.05 mm and 3 mm, between about 0.05 mm and 2 mm, between about 0.1 mm and 3 mm, between about 0.1 mm and 2 mm, between about 0.1 mm and about 1 mm, between about 0.1 mm and 0.6 mm. In some embodiments, the thickness may be 0.05 mm, 0.1 mm, 0.5 mm, 0.6 mm, 0.7 mm, 0.8 mm, 0.9 mm, 1 mm, 2 mm, 3 mm, 4 mm, 5 mm, 6 mm, or any range having any two of these values as endpoints. For example, the thickness may be from about 0.05 mm to about 6 mm, from about 0.05 mm to about 5 mm, from about 0.05 mm to about 4 mm, from about 0.05 mm to about 3.5 mm, from about 0.05 mm to about 3 mm, from about 0.05 mm to about 2.5 mm, from about 0.05 mm to about 2 mm, from about 0.05 mm to about 1.5 mm, from about 0.05 mm to about 1.2 mm, from about 0.05 mm to about 1 mm, from about 0.1 mm to about 6 mm, from about 0.2 mm to about 6 mm, from about 0.3 mm to about 6 mm, from about 0.4 mm to about 6 mm, from about 0.5 mm to about 6 mm, from about 0.55 mm to about 6 mm, from about 0.7 mm to about 6 mm, from about 0.8 mm to about 6 mm, from about 0.9 mm to about 6 mm, from about 1 mm to about 6 mm, from about 1.1 mm to about 6 mm, from about 1.2 mm to about 6 mm, from about 1.5 mm to about 6 mm, from about 2 mm to about 6 mm, from about 2.5 mm to about 6 mm, from about 3 mm to about 6 mm, from about 0.1 mm to about 1 mm, from about 0.3 mm to about 1 mm, from about 0.4 mm to about 1 mm, from about 0.5 mm to about 1 mm, or from about 0.3 mm to about 0.7 mm. In some embodiments, the micro-perforations may be spaced (e.g., "pitch") between about 0.05 mm and 6 mm apart. In the case of non-uniform spacings, the pitch may be calculated as the average distance between micro-perforations if they are distributed evenly.

In some embodiments, the micro-perforations have a generally circular cross-section through the thickness of the panel. In some embodiments, the micro-perforations have a non-circular cross-section through the thickness of the panel. In some embodiments, the shape of the micro-perforation through a cross-section of a panel varies, or is substantially constant.

In some embodiments, the diameter is between about 0.02 mm and 5 mm, between about 0.05 mm and 2 mm, between about 0.1 mm and 2 mm, between about 0.1 mm and about 1 mm, between about 0.1 mm and 0.6 mm.

In some embodiments, the panel is configured to decrease reverberation time of an operative environment. As used herein, "operative environment" may include an enclosed or semi-enclosed environment that requires a certain acoustic environment. For example, conference rooms, offices, schools, hospitals, manufacturing facilities, clean rooms (food, pharmaceutical), museums, historical buildings, restaurants, etc., may all be "operative environments". In some embodiments, the panel is integrated in a lighting solution, for example, a lighting fixture in a ceiling or a wall. In this regard, the transparent nature of the panel is used to allow for light, while taking advantage of the noise reduction properties of the panel. Natural air spacing behind the panel (in the lighting fixture) may also be advantageous from a noise reduction perspective.

In some embodiments, the panel includes a strengthened glass or glass ceramic. The use of glass or glass ceramic materials allows for favorable properties, including any one of or a combination of providing a transparent, translucent or opaque appearance, providing durability, providing resistance to corrosion, providing design flexibility, and providing flame resistance.

In some embodiments, for a strengthened glass, the surface compression is balanced by a tensile stress region in the interior of the glass. Surface compressive stress ("CS") greater than 400 MPa, greater than 500 MPa, greater than 600 MPa, greater than 700 MPa, or greater than 750 MPa and compressive stress layer depths (also called depth of compression, or "DOC") greater than 40 microns are readily achieved in some glasses, for example, alkali aluminosilicate glasses, by chemically strengthening processes (e.g., by ion exchange processes). DOC represents the depth at which the stress changes from compressive to tensile.

In some embodiments, the panel includes a non-strengthened glass, for example, a soda-lime glass. In some embodiments, the panel includes strengthened glass or glass ceramic that is mechanically, thermally or chemically strengthened. In some embodiments, the strengthened glass or glass ceramic may be mechanically and thermally strengthened, mechanically and chemically strengthened or thermally and chemically strengthened. A mechanically-strengthened glass or glass ceramic may include a compressive stress layer (and corresponding tensile stress region) generated by a mismatch of the coefficient of thermal expansion between portions of the glass or glass ceramic. A chemically-strengthened glass or glass ceramic may include a compressive stress layer (and corresponding tensile stress region generated by an ion exchange process). In such chemically strengthened glass and glass ceramics, the replacement of smaller ions by larger ions at a temperature below that at which the glass network can relax produces a distribution of ions across the surface of the glass that results in a stress profile. The larger volume of the incoming ion produces a CS on the surface portion of the substrate and tension in the center of the glass or glass ceramic. In thermally-strengthened glass or glass ceramics, the CS region is formed by heating the glass or glass ceramic to an elevated temperature above the glass transition temperature, near the glass softening point, and then cooling the surface regions more rapidly than the inner regions of the glass or glass ceramic. The differential cooling rates between the surface regions and the inner regions generates a residual surface CS, which in turn generates a corresponding tensile stress in the center region. In one or more embodiments, the glass substrates exclude annealed or heat strengthened soda lime glass. In one or more embodiments, the glass substrates include annealed or heat strengthened soda lime glass In some embodiments, the glass or glass ceramic may have surface compressive stress of between about 100 MPa and about 1000 MPa, between about 100 MPa and about 800 MPa, between about 100 MPa and about 500 MPa, between about 100 MPa and about 300 MPa, or between about 100 MPa and about 150 MPa. In some embodiments, the DOC may be between 0.05*t and about 0.21*t (where t is thickness of the glass or glass ceramic in micrometers). In some embodiments, DOC may be in the range from about 0.05*t to about 0.2*t, from about 0.05*t to about 0.18*t, from about 0.05*t to about 0.16*t, from about 0.05*t to about 0.15*t, from about 0.05*t to about 0.12*t, from about 0.05*t to about 0.1*t, from about 0.075*t to about 0.21*t, from about 0.1*t to about 0.21*t, from about 0.12*t to about 0.21*t, from about 0.15*t to about 0.21*t, from about 0.18*t to about 0.21*t, or from about 0.1*t to about 0.18*t.

Using a sound dampening panel made of unstrengthened glass or glass ceramic may pose a safety risk. For example, the panel may break into large shards if damaged. Thermal tempering may remove this safety risk, leading to the development of glass or glass ceramic acoustic panels that have safety attributes and high acoustic performance. Currently, the minimum known thickness for glass or glass ceramic to be tempered is 2 mm. However, as the glass thickness increases, the acoustic absorption performance of the panels decreases. In some embodiments, good acoustic performance is achieved in tempered glass or glass ceramic thickness using multiple acoustic panels. This use of multiple panels may be desirable in various fields, including interior architectural applications. The terms "tempered," "thermally tempered," and "thermally strengthened," and variations thereof, refer to the same effect.

Figure 30:
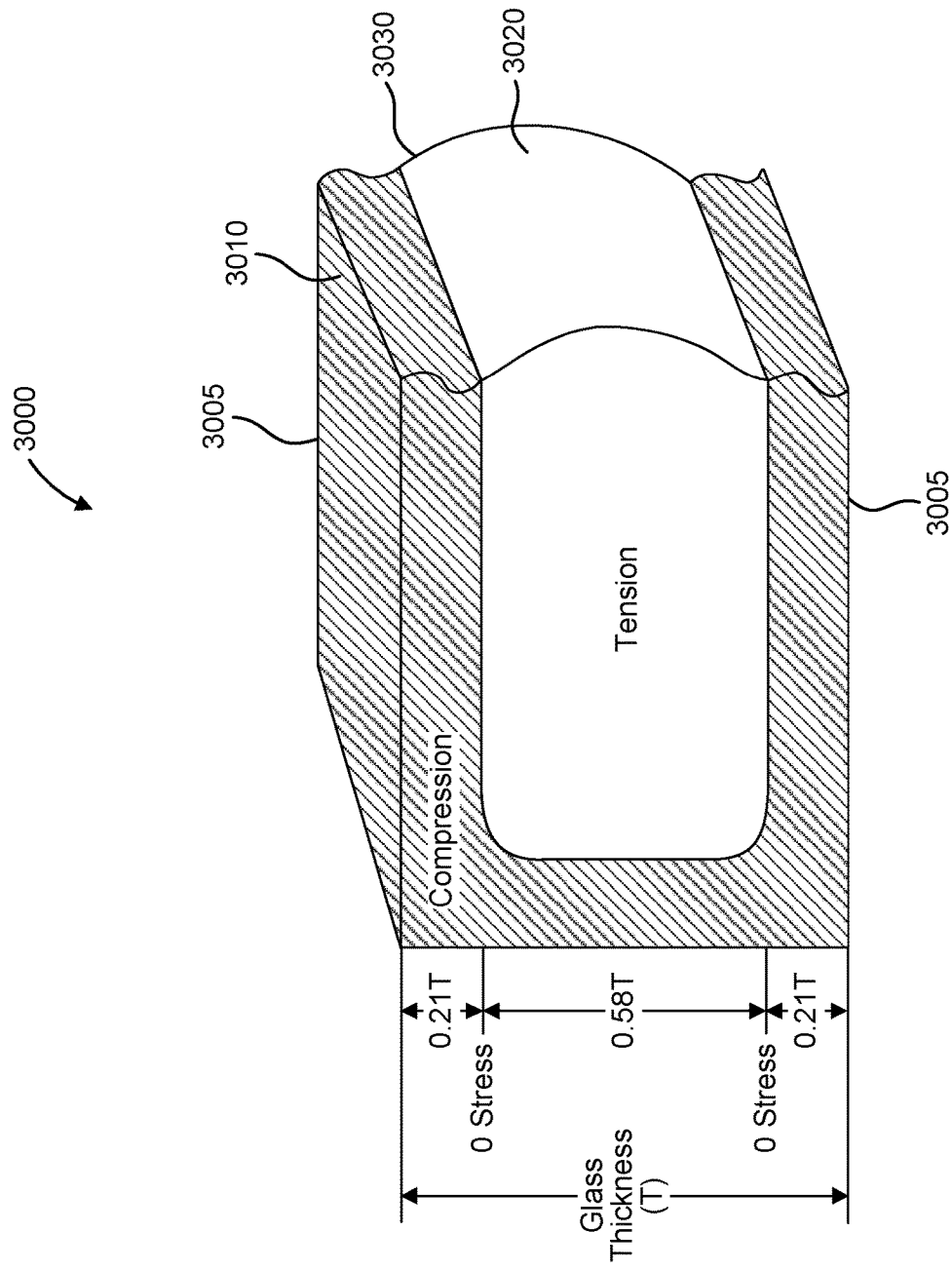
FIG. 30 shows an example of tempered glass or glass ceramic.

FIG. 30 shows an example of tempered glass or glass ceramic. As a result of thermal treatment, a portion of a panel 3000 has a region 3010 of compression extending from the surface 3005 of panel 3000 to a depth of compression 3030. The material of panel 3000 is in compression in region 3010, which may be referred to as a region of surface compression. Region 3020, which is a region of tensile stress, is the part of panel 3000 that is farther from surface 3005 than the depth of compression 3030. In the example of FIG. 30, the depth of compression is 0.21 times the thickness of panel 3000. As a result, the thickness of region 3010 is 0.21 times the thickness of panel 3000, extending from each surface of panel 3000. The thickness of region 3020 is 0.58 times the thickness of panel 3000.

Thermal tempering may be performed after holes are formed in a panel to create a micro-perforated panel. Once properly tempered, glass or glass ceramic panels dice in to small pieces upon breakage as outlined in ANSI 97.1. The tempering process involves heating AMG (Acoustic Management Glass) glass panels to their critical temperature (>650 C) and subsequently rapidly cooling to create a desired stress profile within the material of the panels (e.g., the glass is then cooled rapidly by a blast of air for a few seconds). As the surface cools quickly and the bulk (interior) material cools slower, the tempering process results in a tensile stress in the bulk of the material and compressive stress on the surface (see FIG. 30). The depth of stress layers is a result of the cooling temperature, time, etc. This tempering process ensures the glass breaks (or dices) in to small pieces upon breakage making it safe for use.

In some embodiments, the panel or article includes a strengthened glass substrate. In some embodiments, the panel or article may have a particular dicing pattern of the glass. In some embodiments, the dicing pattern may be that of a safety glass. In some embodiments, the glass may be strengthened to have an optimum average size and size distribution of broken pieces, average angles of sharp point and distributions around those average angles, and/or distance of ejection upon breakage such that safety risks are reduced.

In some embodiments, the panel has an NRC of between about 0.3 and 1, or between about 0.3 and 0.8. In some embodiments, the panel has a predetermined sound absorption coefficient over a predetermined frequency band between 250 Hz and 6000 Hz, or between 250 Hz and 20,000 Hz. In some embodiments, the panel may be "tuned" to absorb particular frequencies of interest, for example, in a machinery room or for a HVAC application. In some embodiments, the panel has an NRC of 0.3, 0.4, 0.5, 0.6, 0.7, 0.8, 0.9, 1.0, or any range having any two of these values as endpoints.

In some embodiments, a portion of an edge of the panel is sealed to a holding portion. In some embodiments, no portion of an edge is sealed to a holding portion. In some embodiments, the article further includes a backing wall 20 (as shown in FIG. 1C) operatively connected to the panel. As used herein, "operatively connected" may include a direct connection or indirect connection, or acoustic connection such that the panel and backing wall work together to increase noise abatement. In some embodiments, the backing wall is an existing, substantially rigid structure in an operative environment (e.g., walls or ceiling in a room). In some embodiments, the backing wall may or may not contribute to acoustic echo. Advantageously, the backing wall may be a rigid or hard surface, so as to not change the acoustic performance of the micro-perforated panel. In some embodiments, the panels may be hung in front of the backing wall or placed in front of the back wall using fixtures, for example.

In some embodiments, the micro-perforations are positioned at uniform intervals along the panel. In some embodiments, the micro-perforations are distributed with uniform density along the panel. In some embodiments, the spacing or pitch may be of non-uniform intervals. In some embodiments, the micro-perforations are distributed with non-uniform density. In some embodiments, non-uniform density or spacing may decrease optical distortion, or be used in decorative applications, for example. In some embodiments acoustic performance may be controlled through the mean distance between micro-perforations to be substantially uniform to maximize sound absorption at a certain frequency. In some embodiments, pitch may be varied across the panel, for example, to achieve broader absorption spectrum. In some embodiments, the micro-perforations are distributed with non-uniform densities, which can find various applications, for example, logos, text, flower patterns, etc.

In some embodiments, the panel of present disclosure includes a coating, such as a photochromic, thermal control, electro-chromic, low emissivity, UV coatings, anti-glare, hydrophilic, hydrophobic, anti-smudge, anti-fingerprint, anti-scratch, anti-reflective, ink-jet decorated, screen-printed, anti-splinter, etc. In some embodiments, the micro-perforations are not blocked by the coating. In some embodiments, the interior of the micro-perforations are not coated. In some embodiments, a portion of the micro-perforations are blocked by the coating. In some embodiments, the panel includes an anti-microbial component.

In some embodiments, the panel of present disclosure may be of uniform thickness, or non-uniform thickness. In some embodiments, the panel may be substantially planar. In some embodiments, the panel may be curved, for example, or have a complex shape. In some embodiments, the panel may be a shape, for example, rectangular, round, etc. In some embodiments, the panel may be flexible. In some embodiments, the panel may be substantially rigid. In some embodiments, the geometric attributes of the panel (e.g., micro-perforation diameter, micro-perforation shape, pitch, panel thickness, etc.) and the absorption coefficient of the panel may be tuned to achieve desired room acoustics.

For example, the reverberation time (e.g., echo) in the room is inversely proportional to the absorption coefficient of the material in the room using the formula:

$$RT_{60} = 0.161 \frac{v}{\Sigma_i \alpha_i S_i}$$

where V is the volume of the room, S is the surface area and a is the absorption coefficient of the material. The reverberation time may be defined as the time it takes for the sound to decay to a given level in an environment. Higher reverberations can be translated to echo. Thus, because conventional glass has near zero sound absorption, this results in a long reverberation time leading to loss of speech intelligibility and an unpleasant acoustic environment. To minimize reflection and achieve good absorptive properties, the panel of present disclosure may be configured to achieve an acoustic resistance (R) along the same order of magnitude as the characteristic impedance of air and a small acoustic mass reactance (M). An optimal acoustic resistance can be obtained by fabricating micro-perforations using the manufacturing process described below, to achieve the desired acoustic requirements as noted in equation below:

$$R = \frac{32\eta t}{\sigma \rho c d^2} k_r; k_r = \left[1 + \frac{k^2}{32}\right]^{\frac{1}{2}} + \frac{\sqrt{2}}{32} k \frac{d}{t}$$

$$M = \frac{t}{\sigma c} k_m; k_m = \left[1 + \frac{k^2}{2}\right]^{-\frac{1}{2}} + 0.85 \frac{d}{t}$$

where d is the hole/micro-perforation diameter, t is thickness of the panel, c is the speed of sound in air, ρ is the air density, σ is the porosity ratio, and η is the viscosity. The perforation constant, k, may be defined in terms of the hole diameter and viscosity of the air as:

$$k = d \sqrt{\frac{\omega \rho}{4\eta}}$$

Subsequently, the acoustic impedance of the MPP is calculated as:

$$Z = R + j\omega M - j\cot(\omega D/c)$$

where ω is the angular frequency, D is the cavity spacing and c is the speed of sound in air. The value j is the square root of negative 1, and cot is cotangent.

The acoustic resistance and mass reactance can be then utilized to predict the acoustic absorption performance of the panel.

Figure 2A:
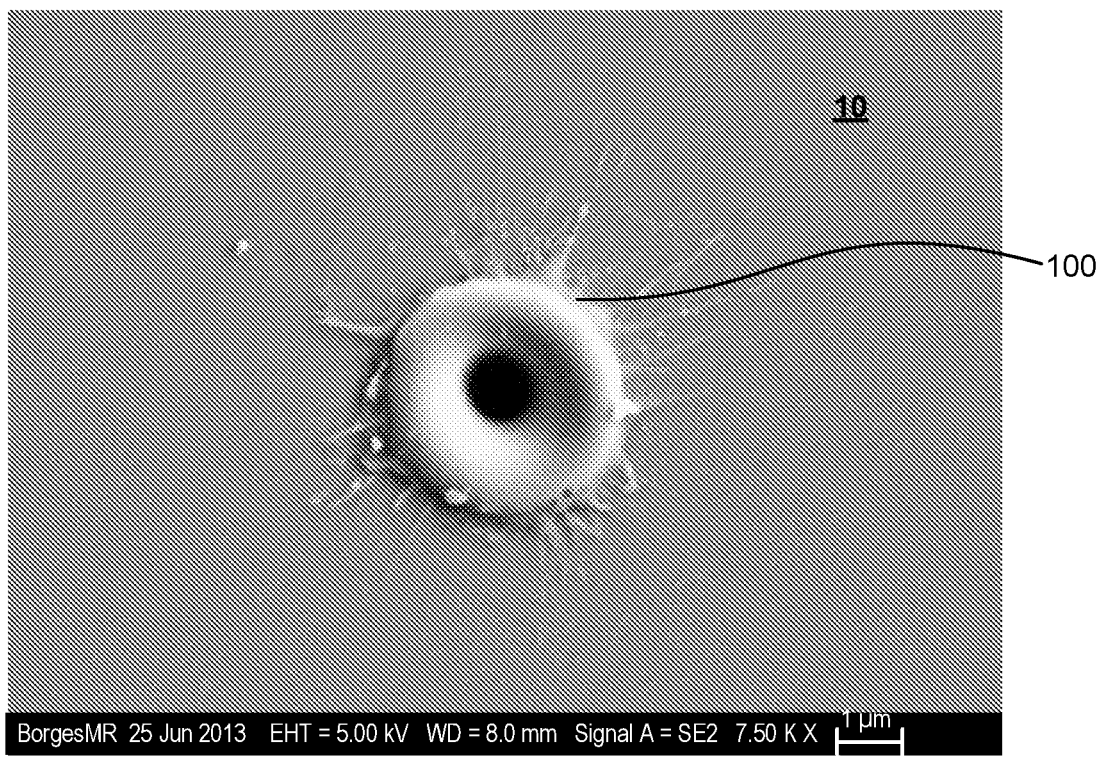
FIG. 2A shows a partial close up view of a micro-perforation according to an embodiment.
Figure 2B:
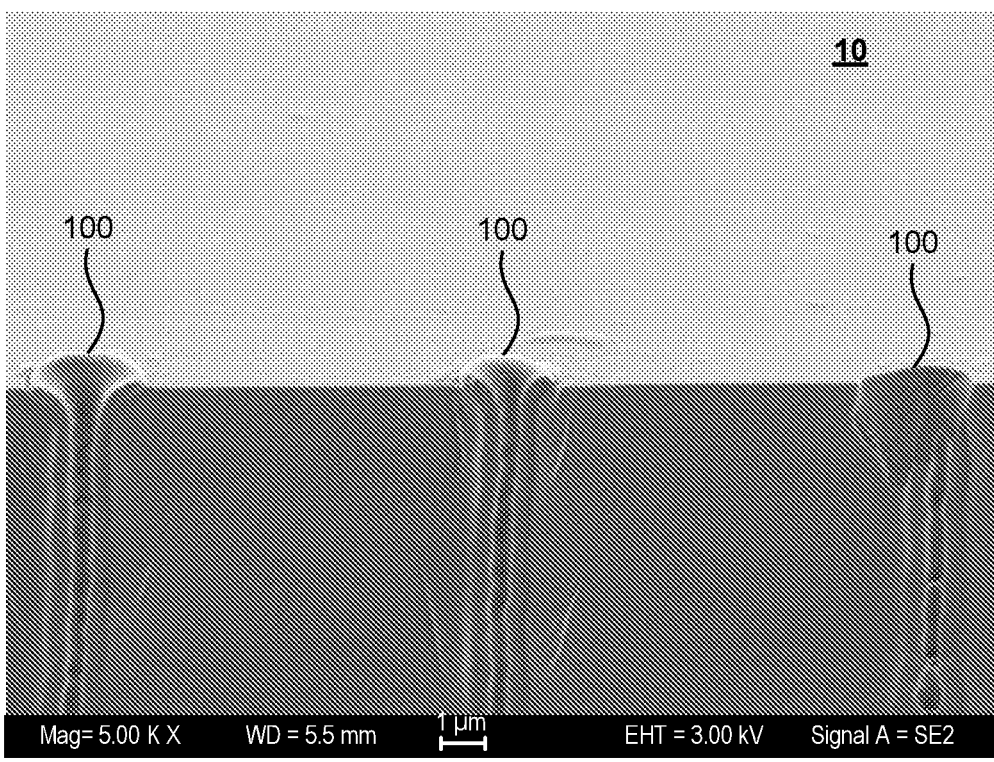
FIG. 2B shows a cross sectional view of micro-perforations according to an embodiment.
Figure 3A:
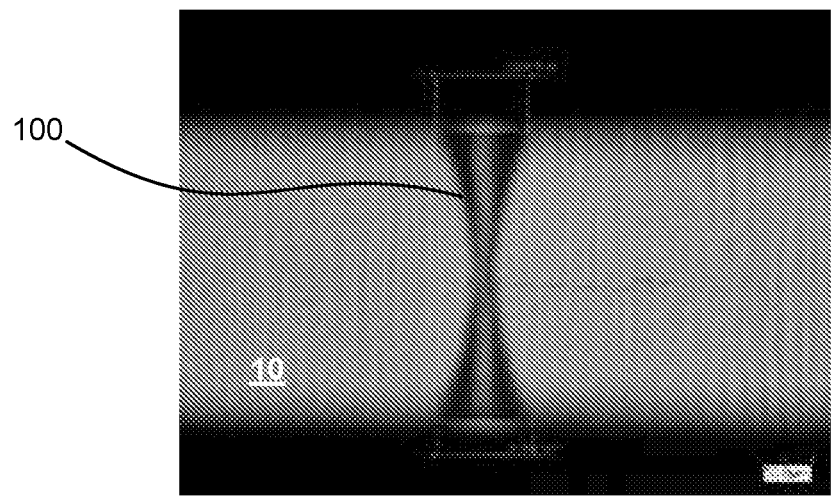
FIG. 3A shows a cross sectional view of a micro-perforation according to an embodiment.
Figure 3B:
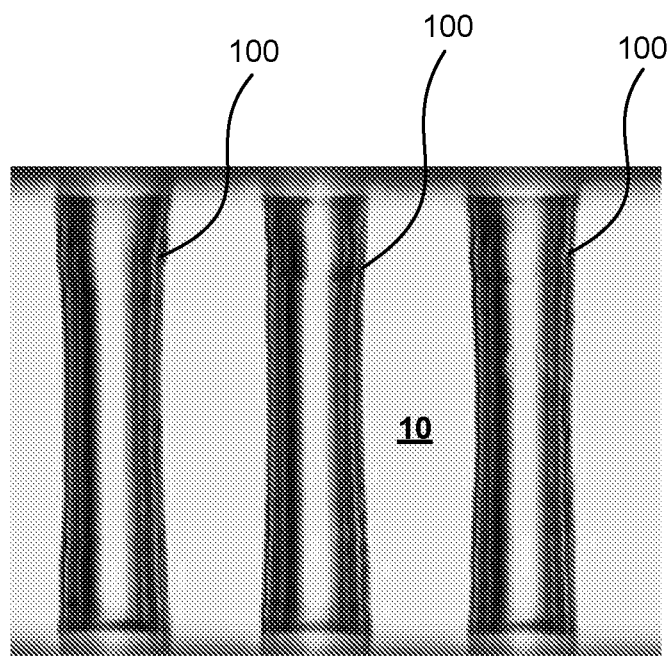
FIG. 3B shows a cross sectional view of micro-perforations according to an embodiment.

FIGS. 2A and 2B show enlarged examples (electron micrograph images) of a top view of a micro-perforation and cross-sectional view of multiple micro-perforations, for example. As shown in FIGS. 3A and 3B, the cross section of the micro-perforations may vary along a length of the micro-perforation through the panel. For example, FIG. 3A shows an hourglass-shaped cross section (or "bottle neck" shaped), where the cross section of the micro-perforations in FIG. 3B are generally cylindrical. In some embodiments, the micro-perforations may be along a constant axis generally normal to a surface of the panel, or may be along a varied axis, or may be positioned not normal to a general surface of the panel.

Figure 1D:
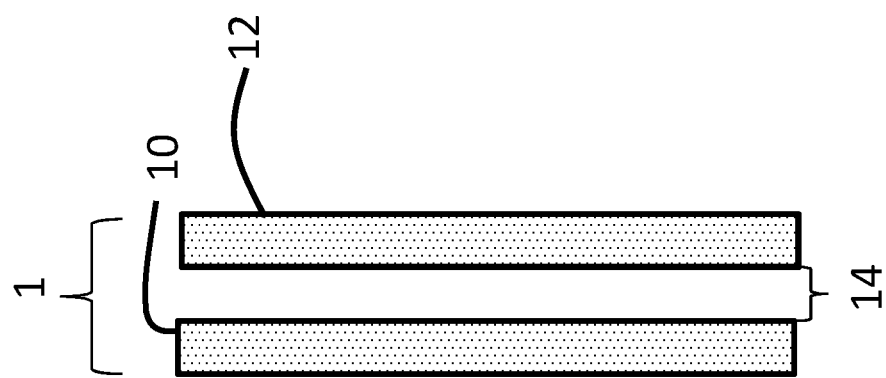
FIG. 1D shows a side view of an article according to an embodiment.

In some embodiments, the articles of present disclosure may include multiple panels (e.g., double leaf, or multi-leaf configurations), as shown in FIG. 1D. For example, in some embodiments, an article, includes a first and second glass or glass ceramic panels (10, 12), each having a thickness, and each having a plurality of micro-perforations having a diameter; wherein the ratio of the thickness of the panels to the diameter of the micro-perforations is less than 25, less than 20, or between about 0.1 and 20. In some embodiments, the first and second panels are spaced from each other defining an intra-panel gap 14. In some embodiments, the first and second panels are generally parallel to each other. In some embodiments, the panels may be spaced with a varying distance from one another, for example, non-parallel spacing, or through variation in dimensions of the panels themselves. In some embodiments, at least a portion of an edge of at least one of the panels is sealed to a holding portion. In some embodiments, one or more panels may have a sealed edge, or none may be sealed. In some embodiments, additional panels may be used, for example with uniform dimensions or varying dimensions. In some embodiments, the multiple panels may be uniformly spaced from one another, or have varying spacing. In one or more embodiments, the first and second glass or glass ceramic panels have the same thickness or a thickness that differ from one another. For example, the first glass or glass ceramic panel 10 may have a thickness greater than the second glass or glass ceramic panel 12. In another example, the second glass or glass ceramic panel 12 may have a thickness greater than the first glass or glass ceramic panel 10.

In one or embodiments including a double leaf configuration, the thickness of one or both the first and second glass or glass ceramic panel is between about 0.05 mm and 6 mm, between about 0.05 mm and 3 mm, between about 0.05 mm and 2 mm, between about 0.1 mm and 3 mm, between about 0.1 mm and 2 mm, between about 0.1 mm and about 1 mm, between about 0.1 mm and 0.6 mm. For example, the thickness of one or both the first and second glass or glass ceramic panel may be from about 0.05 mm to about 6 mm, from about 0.05 mm to about 5 mm, from about 0.05 mm to about 4 mm, from about 0.05 mm to about 3.5 mm, from about 0.05 mm to about 3 mm, from about 0.05 mm to about 2.5 mm, from about 0.05 mm to about 2 mm, from about 0.05 mm to about 1.5 mm, from about 0.05 mm to about 1.2 mm, from about 0.05 mm to about 1 mm, from about 0.1 mm to about 6 mm, from about 0.2 mm to about 6 mm, from about 0.3 mm to about 6 mm, from about 0.4 mm to about 6 mm, from about 0.5 mm to about 6 mm, from about 0.55 mm to about 6 mm, from about 0.7 mm to about 6 mm, from about 0.8 mm to about 6 mm, from about 0.9 mm to about 6 mm, from about 1 mm to about 6 mm, from about 1.1 mm to about 6 mm, from about 1.2 mm to about 6 mm, from about 1.5 mm to about 6 mm, from about 2 mm to about 6 mm, from about 2.5 mm to about 6 mm, from about 3 mm to about 6 mm, from about 0.1 mm to about 1 mm, from about 0.3 mm to about 1 mm, from about 0.4 mm to about 1 mm, from about 0.5 mm to about 1 mm, or from about 0.3 mm to about 0.7 mm.

In some embodiments, the intra-panel gap distance may be varied according to acoustic requirements and part of the overall design to absorb specific frequencies. In some embodiments, the intra-panel gap may be varied according to the aspect ratio, micro-perforation size, pitch, panel thickness, and the frequency range of interest, for example. In some embodiments, additional panels may be included, with multiple intra-panel gaps such that the system broadens the absorption spectra (in frequency), for example, or increases the absorption magnitude. In some embodiments, the separation distance between panels defined by intra-panel gap may be between about 1 mm and 500 mm, between about 1 mm and 100 mm, between about 1 mm and 50 mm.

Figure 4B:
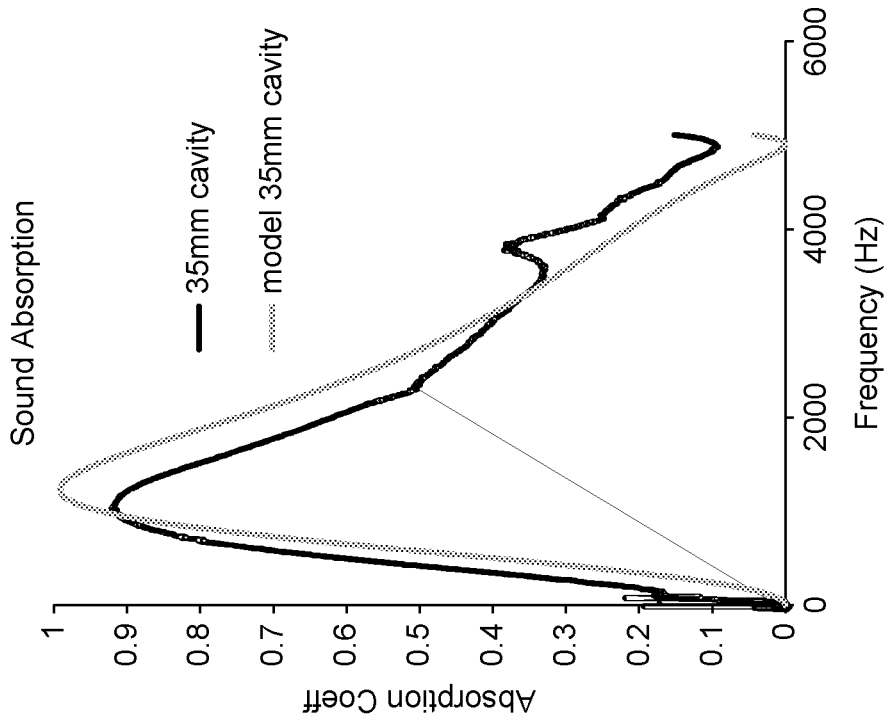
FIG. 4B shows representative sound absorption coefficient across various frequencies for a single micro-perforated panel according to an embodiment (35 mm cavity spacing).
Figure 4A:
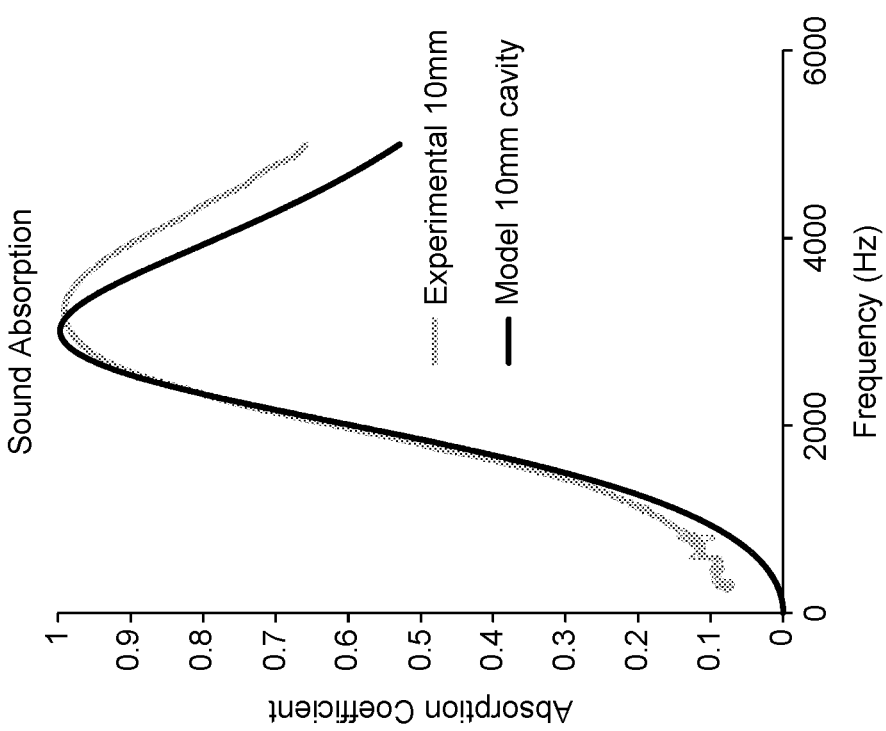
FIG. 4A shows representative sound absorption coefficient across various frequencies of a single micro-perforated panel according to an embodiment (10 mm cavity spacing).

FIGS. 4A and 4B show absorption coefficient along frequency bands for two micro-perforated panels. For both figures, Normal Incidence Acoustic Absorption is measured at different cavity spacing, that is, air spacing from a backing wall for a single panel arrangement. These figures show a comparison of the modeled data for different air spacing. In the figures, an absorption coefficient of "1" indicates complete absorption. It can be observed that the cavity spacing has an effect on the peak absorption frequency (e.g., lower frequency spectrum peak illustrated in FIG. 4B). In this test, the hole/micro-perforation diameter were about 200 µm with a pitch of about 1 mm, and the thickness of about 0.5 mm. The model data was obtained by developing a code to calculate acoustic impedance from the equations described above, and subsequently calculating the absorption coefficient (Maa's Theory) using the formula:

$$\alpha = \frac{4\text{Re}[Z]}{(1 + \text{Re}[Z])^2 + (\text{Im}[Z])^2}$$

where $\alpha$ is the absorption coefficient, Re[Z] is the real part of the acoustic impedance, and Im[Z] is the imaginary part of the acoustic impedance.

Figure 5B:
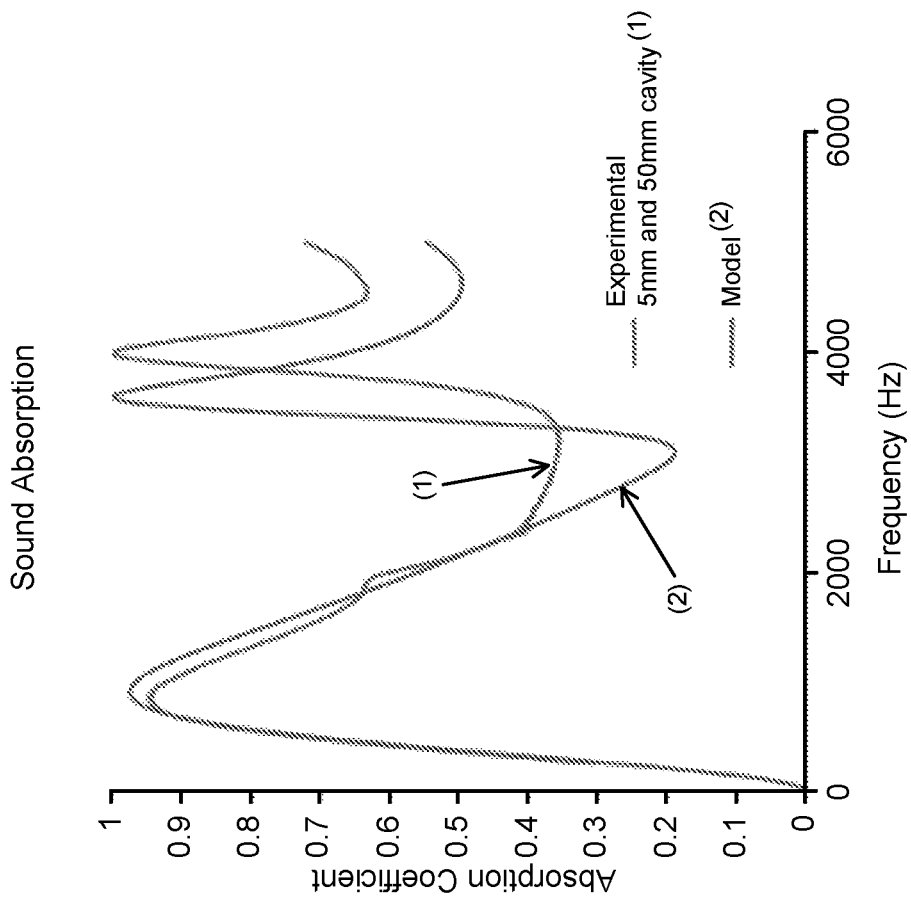
FIG. 5B shows representative sound absorption coefficient across various frequencies of a double leaf micro-perforated panel arrangement according to an embodiment (5 mm and 50 mm cavity spacing, respectively).
Figure 5A:
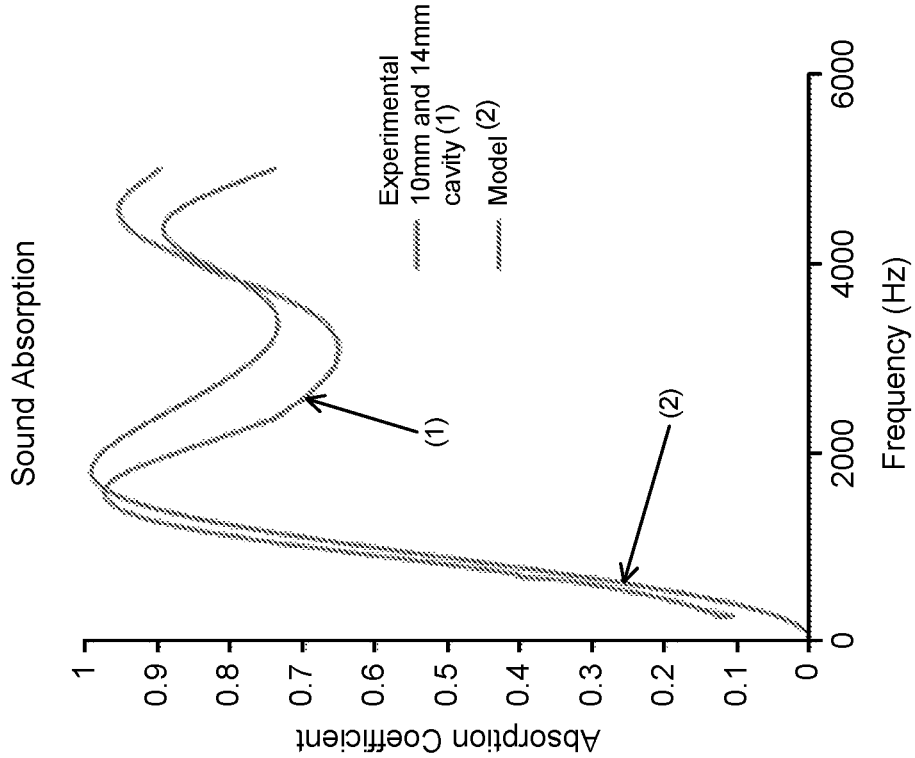
FIG. 5A shows representative sound absorption coefficient across various frequencies of a double leaf micro-perforated panel arrangement according to an embodiment (10 mm and 14 mm cavity spacing, respectively).

Similarly, FIGS. 5A and 5B show absorption coefficient along frequency bands for two articles of multi-leaf panel configurations. In this example, as the test utilized a multi-leaf panel configuration, the first air spacing is between the two panels and the second air spacing is between the inner panel and the backing wall. In the figures, the first distance (about 10 mm in FIG. 5A, and about 5 mm in FIG. 5B) corresponds to the inner separation and second distance (about 14 mm in FIG. 5A, and about 50 mm in FIG. 5B) corresponds to the distance between the inner layer and the back wall. As shown in the figures, dual peaks are related to the individual resonances created by the different distances. Advantageously, the peak absorptions will shift based on the distances between the layers and/or back wall.

Figure 6:
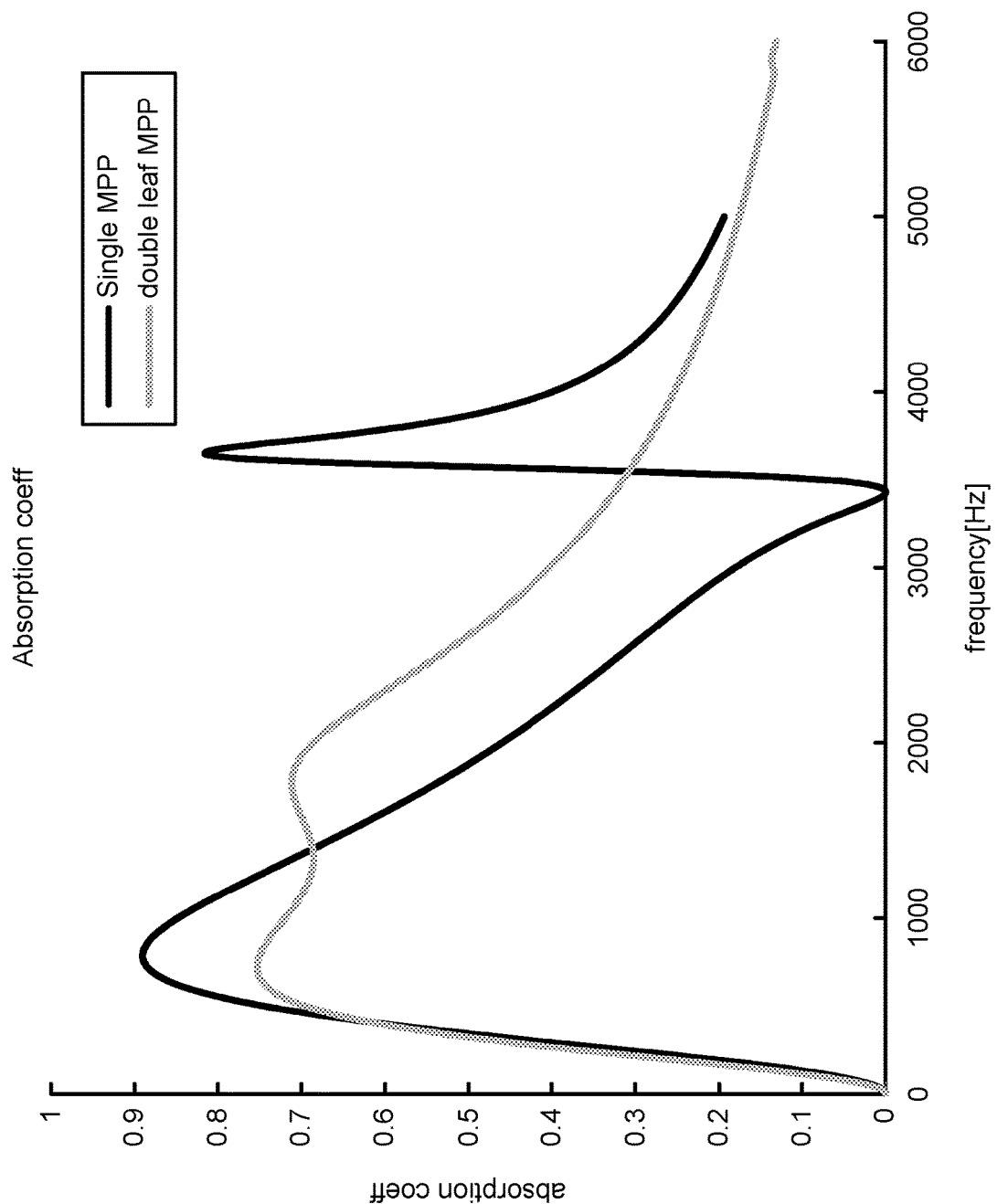
FIG. 6 shows representative sound absorption coefficient across various frequencies of both a single micro-perforated panel and a double leaf micro-perforated panel arrangement according to an embodiment.

As shown in FIG. 6, for example, a single panel configuration is contrasted with a double leaf panel configuration. As shown, the multi panel configuration model results in a broader frequency spectrum of desirable sound absorption coefficient. Multiple panel configurations can significantly widen the frequency bandwidth of its absorption and address both low and high frequency applications. For example, a double leaf panel arrangement may include two micro-perforated panels arranged parallel to and spaced from each other. The panels may be configured with or without a rigid backing wall. Similar to a single micro-perforated panel ("MPP"), a double-leaf micro-perforated panel ("DLMPP") acts a Helmholtz resonator. Additionally, the spacing between the multiple panel layers and backing wall can be arranged in such a manner as to combine the two resonance behaviors and widen the frequency bandwidth of its absorption. A DLMPP without a rigid backing wall acts as a space absorber and may be particularly advantageous in areas such as meeting room dividers, open office spaces etc.

Some embodiments of present disclosure are directed to a method of forming micro-perforations in a glass or glass ceramic panel, including: (i) forming a plurality of damage tracks into the glass or glass ceramic panel by a laser beam, wherein the panel extends in a plane and has a thickness, and wherein the damage tracks have a first diameter; and (ii) etching the panel obtained from (i) in an acid solution to form a micro-perforated panel with micro-perforations having a second diameter, wherein the NRC of the micro-perforated panel is between about 0.3 and 1, or between about 0.3 and 0.8.

Figure 7:
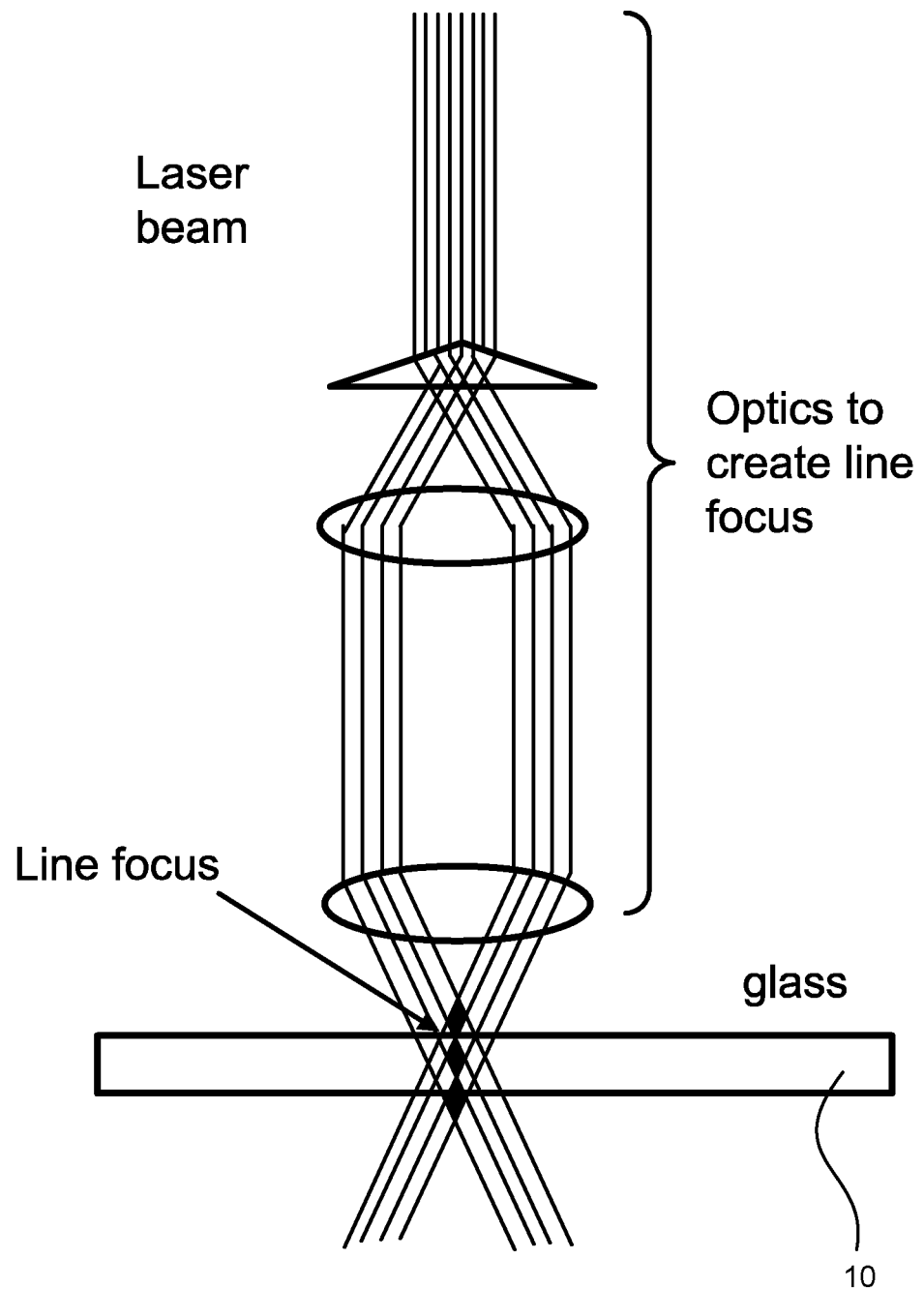
FIG. 7 shows a schematic view of a laser system according to an embodiment.
Figure 8:
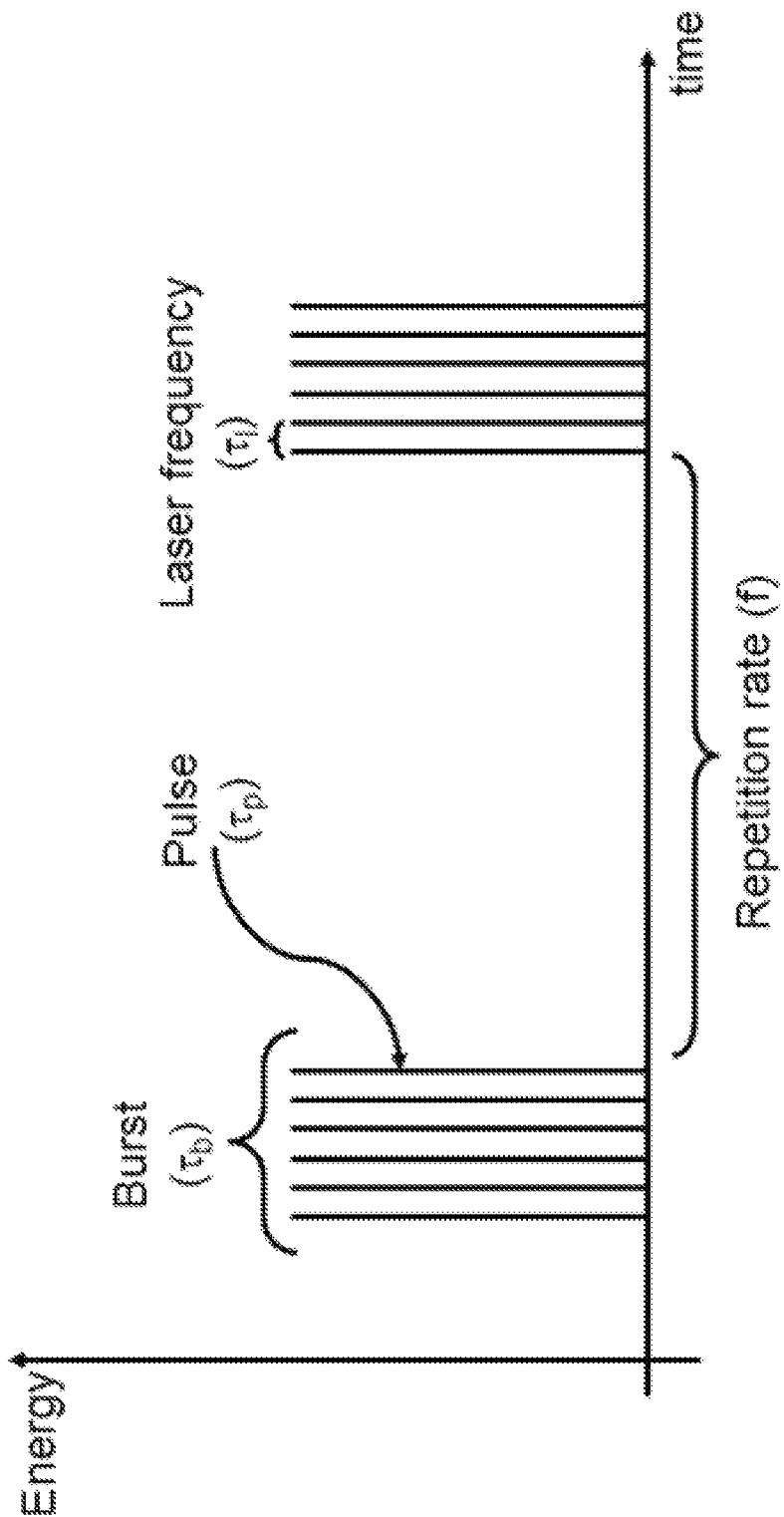
FIG. 8 shows a representative laser burst pattern according to an embodiment.
Figure 9:
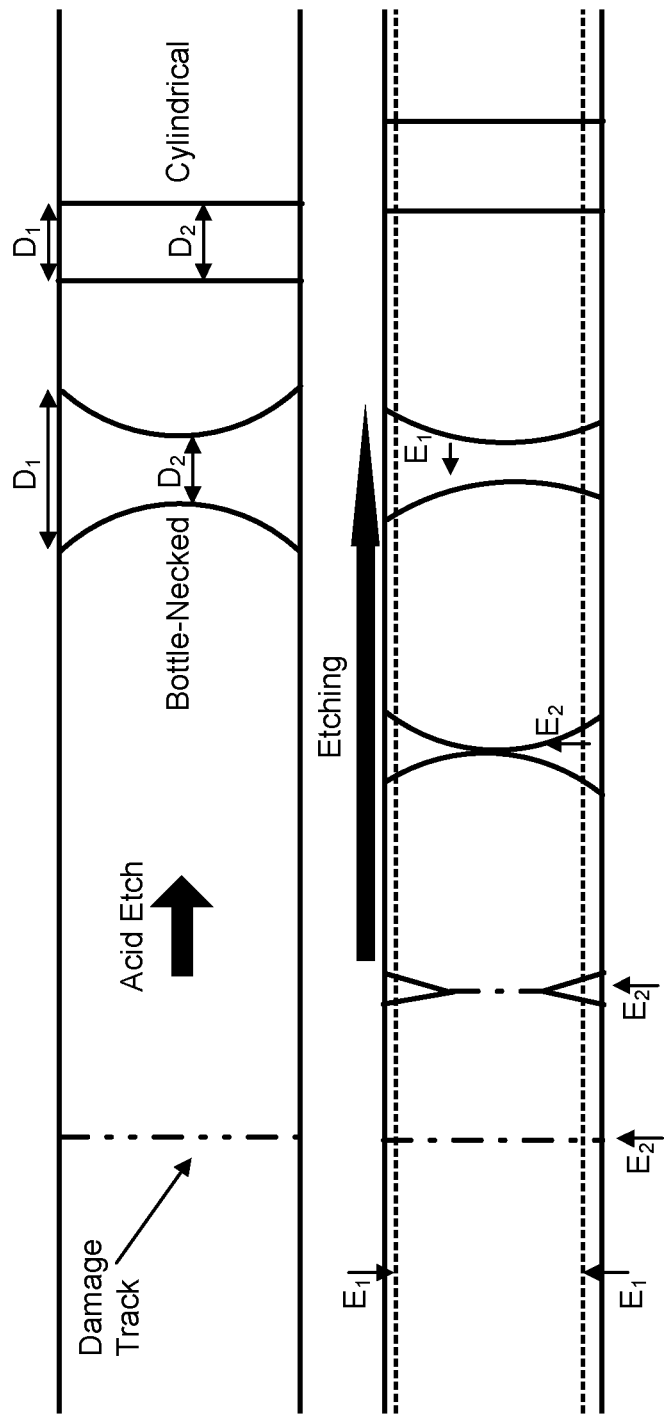
FIG. 9 shows a schematic illustration of a representative method of forming a micro-perforated panel according to an embodiment.

The method is generally illustrated in schematic FIGS. 7-9. In some embodiments, the laser beam is a pulsed laser beam having a focal line oriented along a beam propagation direction and directing the laser beam focal line into the panel. In some embodiments, the method further includes, etching the glass panel in a second acid solution that is different from the first acid solution. In some embodiments, the method further includes, chemically or thermally strengthening the micro-perforated panel. In some embodiments, the glass or glass ceramic panel comprises a high-strength glass or glass ceramic composition. In some embodiments, the thickness of the glass or glass ceramic panel is between about 0.05 mm and 6 mm.

In some embodiments, the laser beam may be a Gauss-Bessel laser beam followed by chemical etching. In some embodiments, the method may be configured as a large scale process, with high throughput. In some embodiments, the method may be used to manufacture panels of large size, for example, 1'×1' (1 foot×1 foot) or larger. The method is a high speed process for manufacturing high density array of holes, and affords flexibility to manufacture various micro-hole shapes, sizes, micro-hole locations and density to tune and achieve the desired acoustic performance. Further, the micro-perforated panels are thermally or chemically strengthened post etching to achieve superior strength, as described herein.

FIG. 7 shows a representative schematic of a drilling method that uses a line focus of a laser beam to create damage tracks (e.g., defects or open regions in a panel) or holes in a panel according to an environment. As shown in FIG. 8, the laser burst pattern (emission vs. time) may be tailored based on a specific need. Representative pattern of a laser system (e.g., a picosecond laser) may be characterized by a burst which may contain one or more pulses. The frequency of the bursts defines the repetition rate of the laser, for example about 100 kHz (10 µsec). The time between sub-pulses may be much shorter, for example about 20 nsec. If the ratio of thickness of the panel to the micro-perforation diameter is to be very low, a cutting operation may be used instead of a laser drilling operation.

In some embodiments, the method includes using a non-diffracting laser beam, for example, a Gauss-Bessel beam. These types of beams can propagate for a considerable distance before diffraction effects have a strong impact on the beam divergence and therefore, when focused, the axial intensity decays much slower compared to Gaussian beams.

To create a Gauss-Bessel beam, an axicon can be combined with a collimating lens and a focusing lens. The exact characteristic of the optical elements (axicon vertex angle, lens focal distance, separation between optical elements, etc.) contribute to the characteristics of the line focus.

In some embodiments, a Nd:YAG laser operating at about 1064 nm and about 532 nm may be used. In some embodiments, a laser wavelength between about the near infrared and about the UV range of the spectrum may be used. The laser may produce a series of bursts separated by about 10 μs or more (repetition rate). Each burst may contain a number of pulses selected by the user in the range of between about 2 and about 20 pulses. In some embodiments, single pulse bursts may be used. Each pulse may have a duration of about 10 ps. In some embodiments, the time between adjacent pulses may be about 20 ns (laser frequency). The laser frequency may be determined by the fundamental frequency of the oscillator in the laser design.

Advantageously, the pulse separation may be set to be about <100 ns in order to optimize the burst effects.

In some embodiments, the transverse and axial energy distributions of a Gauss-Bessel beam may be controlled. In some embodiments, the laser diameter (e.g., full width of the beam at half its maximum intensity) of the central lobe of the transverse distribution is about 1 μm and about 1.35 mm for the axial distribution.

In some embodiments, an energy range that results in a damage track is between about 50 μJ and about 200 μJ per burst. In some embodiments, the energy range that results in a damage track may be varied depending on, for example, the optical configuration, burst number, glass composition, etc. The exact timing, pulse durations, and repetition rates can vary depending on the laser design.

Advantageously, relatively short pulses (e.g., about <15 psec) of high intensity may be used.

In some embodiments, optimum optical elements and laser conditions are used to create a region of high laser intensity (line focus) longer than the panel thickness. When the intensity is high enough, the laser interaction with the panel falls in the nonlinear regime and includes two photon absorption, Kerr effect, and cascade ionization, among others. Damage tracks created by laser serve as a preferential path for the wet etching process. The damage tracks can be up to about 2 mm in depth by using a single burst per hole. These damage tracks may generally take the form of holes with interior dimensions of between about 0.5 μm and about 1.5 μm.

In some embodiments, an array of micro-holes (that will eventually become finished micro-perforations) may be formed as described above. In some embodiments, target locations of the holes on the panel are uploaded to the laser processing machine as a set of coordinates. In some embodiments, the machine raster scans the panel and synchronizes the laser trigger such that the laser fires whenever a hole is desired. In some embodiments, the stages move at about 1 m/s and the time per raster may be independent of hole density.

In some embodiments, the laser damaged panel (e.g., glass panel) is then acid etched to open the holes to the desired diameter and shape. The acid etching processing of the glass may be performed by using a hydrofluoric acid (HF) based solution, for example, to chemically attack and remove material from the preferential damage track created by the laser. In some embodiments, while this reaction is occurring, byproducts such as alkali or aluminofluorates are generated depending on the glass composition. These byproducts are relatively insoluble in HF. In some embodiments, a secondary mineral acid is added, for example, nitric acid ($HNO_3$). The addition of the nitric acid increases the solubility of these etchant byproducts as well as the overall etch rate to prevent clogging of the etch holes and lengthen bath life.

In some embodiments, and as shown in FIG. 9, the shape of the etched micro-perforation may depend on the ratio of reaction rate to diffusion rate. The reaction rate directly effects the etch rate of the bulk glass (E1) on the surface while the diffusion rate drives the etch rate of the hole (E2). The reaction rate or effective etch rate is driven by kinetics and can be controlled by the etchant chemistry, glass composition, and temperature. For example, using a more concentrated HF solution, a glass of weaker bonding network, or an increased bath temperature can all increase the reaction rate of the system by introducing more available hydronium and fluorine ions and adding energy to allow them to react at a higher rate. The diffusion rate is the rate at which these active ions are introduced to the bulk or inside the glass part to react with new glass molecules. Diffusion may be affected by many factors such as agitation (e.g., ultrasonics and recirculation), wettability of the part, and temperature. By adjusting these parameters the shape of the micro-perforation may be tailored from an hourglass to a cylindrical opening Examples of non-circular openings and non-circularly cylindrical micro-perforations are shown in FIGS. 10 and 11, for example.

For example, in some embodiments, the acid etchant used is about 1.5 M hydrofluoric and about 1.6 M nitric acids having an affective etch rate of about 1.0 μm/min. The panels may be etched in a JST etching system equipped with a directly coupled, base ultrasonic transducer with an output frequency of about 40 kHz. In some embodiments, the panels are vertically agitated at about 300 mm/s while the etchant is recirculated bottom to top within the bath. This agitation increases diffusion into the holes and helps to homogenize the ultrasonic waves that meet the glass surface. In some embodiments, the bath temperature is maintained at about 20.3 C.° (within about +/−0.1 C.°) by pumping cooler etchant from the bottom. Warmer etchant, which is heated by the ultrasonics, overflows and is routed back through a chiller. This configuration of etching process allows for the appropriate amount of diffusion of acid into the damage tracks so that the resulting micro-perforations are open and may be substantially cylindrical. To attain a more hourglass shape in the hole, the ultrasonics in the system may be turned off to decrease the diffusion into the hole which in turn decreases the etch rate of the hole interior (E2). The shape of the holes can be tailor by adjusting the ratio of diffusion rate to reaction rate by tuning parameters such as concentration, temperature, agitation, etc.

After etching, in some embodiments, the panel may be tempered, or chemically treated (e.g., an ion-exchanging operation) to strengthen the micro-perforated glass panel.

Figure 12:
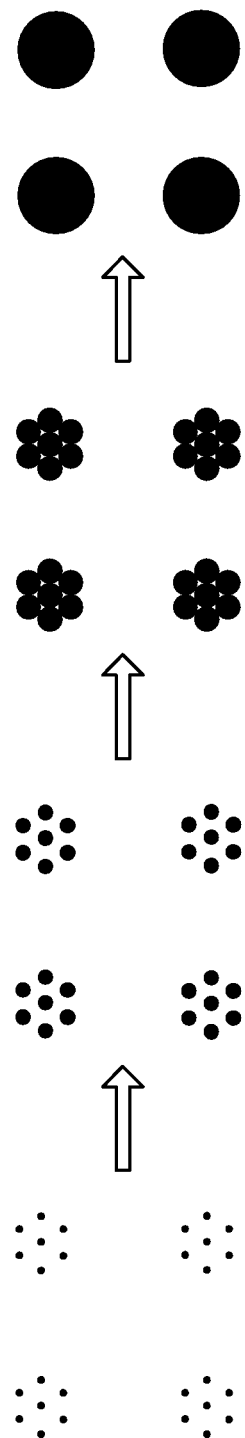
FIG. 12 shows a schematic illustration of a representative method of forming a micro-perforated panel according to an embodiment.

The present disclosure also provides a method of forming micro-perforations in a glass or glass ceramic panel, similar to those described above. As shown in FIG. 12, for example, the method includes forming a subset of damage tracks into the glass or glass ceramic panel by a laser beam, wherein damage tracks are positioned to form a pattern. In some embodiments, the laser damages the material using several laser pulses. In some embodiments, the laser process creates groups of damage tracks in close proximity, which then merge together forming larger holes during an etching process to create the final micro-perforated panel. In some embodiments, the layout of the damage tracks may be used to create any arbitrary shape by pre-positioning the laser damage track locations such that when merged they may form a designated shape (e.g., circle, triangle, square, other polygon, non-linear shape, text or numerals, logos, decorative patterns such as flowers, etc.). In some embodiments, the method includes forming a plurality of damage tracks into the glass or glass ceramic panel by a laser beam, wherein the panel extends in a plane and has a thickness, and wherein the damage tracks have a first diameter, similar to the methods described above. In some embodiments, the method includes etching the panel in an acid solution such that the subset of damage tracks merge to form a micro-perforated panel with micro-perforations having a second diameter (as illustrated in FIG. 12, for example). In some embodiments a single laser may be used to create the damage tracks. In some embodiments, multiple lasers may be used to create the damage tracks. In some embodiments, a galvonometer system may be used to create the damage tracks.

As shown in FIG. 12, individual damage tracks may be configured such that they merge as they form holes as the material etches, until the desired hole aperture shape is obtained (e.g., a circle in FIG. 12). In this regard, any arbitrary shape may be achieved based upon the positioning of the damage tracks and etching process.

Figure 13:
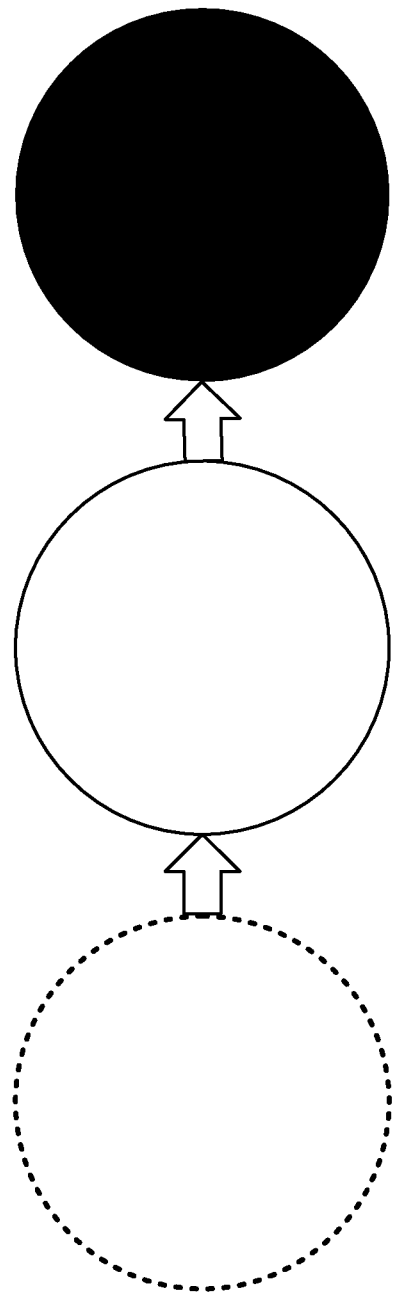
FIG. 13 shows a schematic illustration of a representative method of forming a micro-perforated panel according to an embodiment.

With reference to FIG. 13, a similar method may be employed by forming a subset of damage tracks into the glass or glass ceramic panel by a laser beam, wherein the damage tracks are positioned to form a peripheral pattern; forming plurality of damage tracks into the glass or glass ceramic panel by a laser beam, wherein the panel extends in a plane and has a thickness, and wherein the damage tracks have a first diameter; and etching the panel in an acid solution such that the subset of damage tracks merge to remove a section of the panel and form a micro-perforated panel with micro-perforations having a second diameter. In this regard, larger holes may be formed (for example greater than about 1.0 mm in diameter). In some embodiments, the peripheral pattern may be configured in any arbitrary shape, such that the damage tracks merge to remove a section of the panel in a desired shape.

In some embodiments, the laser can be programmed to create single or multiple tiny adjacent damage tracks to font) a plurality of damage tracks close to each other through control of the burst pattern or location. In some embodiments, the spacing between the adjacent damage tracks can be tailored to the desired perforation shape or perforation size on the panel. For example, to create an elliptical hole shape, the laser can be programmed to create more adjacent damage tracks along a center line and less damage tracks above and below the center line. Upon etching in an acid solution this pattern will result in an elliptical shape as opposed to creating a circular hole shape with a single laser damage track.

In some embodiments, the laser can be programmed to strike the glass with multiple damage tracks on a particular section of the glass and also strike it to create less damage tracks on other sections. In some embodiments, the laser can be programmed to strike the glass in the same location multiple times. Upon etching, this will result in a panel with different hole sizes along the panel, which allows for control of micro-perforation size along the surface of the panel.

Advantageously, in some embodiments, this particular method results in a high speed micro-perforation process. By using multiple laser pulses to create a plurality of damage tracks adjacent to one another, and followed by a chemical etching process to connect the damage tracks to form a larger perforation or hole, this process increases speed for creating such perforations/holes. In turn, the micro-perforations or holes may be applied in use for acoustic applications or other applications, for example, for decorative purposes.

Compared to a process described above, in which a single laser pulse is used to create a preferential damage track followed by the chemical etching to enlarge the perforations to the desired size or shape, a process utilizing multiple laser pulses to create adjacent damage tracks reduces the chemical etching time significantly, resulting in a process that is at least about 1.5 times greater than the speed of a single laser pulse method. Advantageously, the method employing several laser pulses enhances the ease of manufacturing high aspect ratio holes in thick glass, achieving lower glass thickness reduction. In turn, these advantages reduce cost of manufacturing (in part to reduced etching time), and allow for high density micro-perforations to be formed relatively quickly, increasing manufacturing throughput of micro-perforated glass panels. The current cost driver for this process is the etching process, and utilizing a process that decreases etching time, hazardous waste, safety hazards, etc., is advantageous. Further, this process utilizing multiple damage tracks results in thickness reduction of the glass panels and therefore improves surface quality through reduced roughness/waviness/surface imperfections from the etching process. Additionally the process results in reduced distortions and increased optical quality.

Further, utilizing several laser pulses is particularly advantageous when micro-perforations or holes of high aspect ratio need to be created (e.g., in perforated sound absorption glass using relatively thick glass, such as in architectural or automotive applications), because etching time is reduced significantly. Additionally, utilizing several laser pulses is particularly advantageous when it is necessary to create perforations/holes of varying sizes and shapes on a single sheet. For example, micro-perforations may be formed in various shapes, as previously described. Different sizes, shapes, densities of perforations or holes may be formed on a single sheet using a single process utilizing different numbers of laser created damage tracks in various patterns, without the need for several separate drilling and etching steps. The cross-section of the perforations may also be controlled, for example, providing control over whether a cross section is generally circularly cylindrical or an "hour glass" shape.

Finally, the methods utilizing multiple damage tracks, acceptable process tolerances may be greater for both the laser drilling and etching, reducing risk and improving yield, especially for large sheets. This is due to the resulting multiple laser drilled holes rendering the etching process relatively less critical, in addition to the laser drilling process being rendered relatively less critical because individual hole quality will have less impact when several laser drilled holes are merged into one hole after etching.

Figure 14:
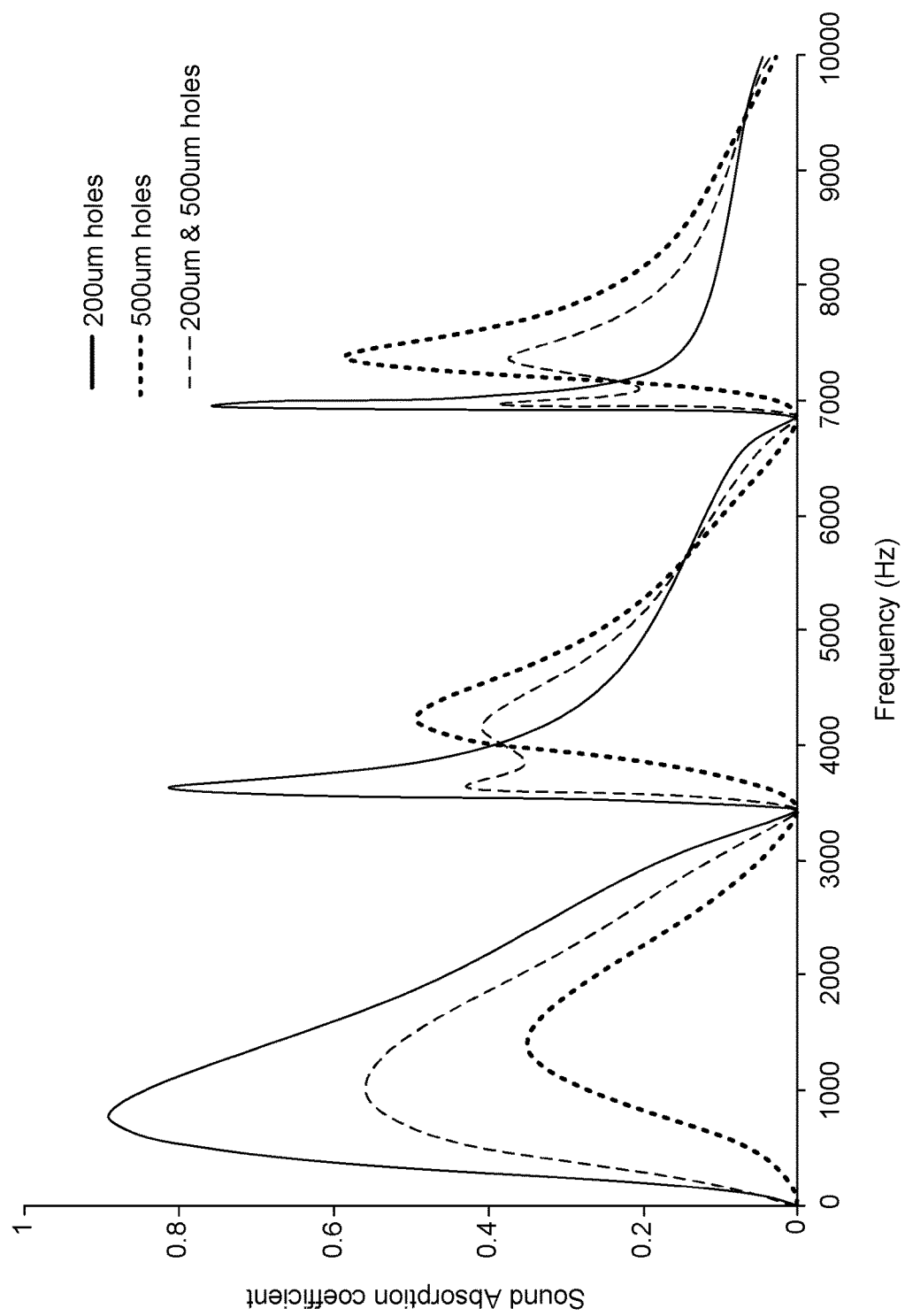
FIG. 14 shows representative sound absorption coefficient across various frequencies of a micro-perforated panel arrangement with various micro-perforation diameters according to an embodiment (200 µm, 500 µm, and both 200 µmm and 500 µm, respectively).
Figure 15:
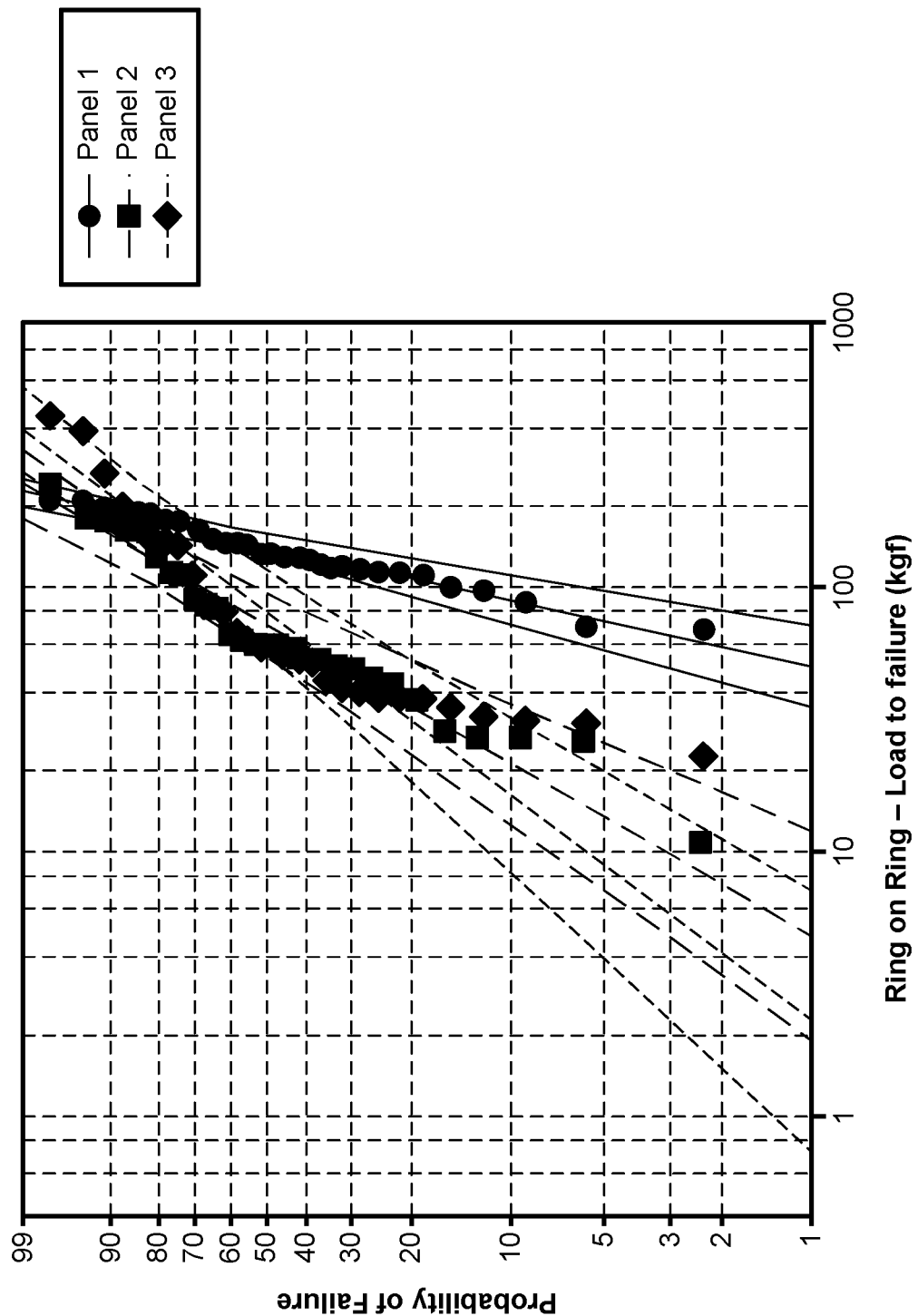
FIG. 15 compares the strengths of two micro-perforated glass panels according to an embodiment with a non-micro-perforated glass panel.

Turning to FIG. 14, exemplary sound absorption coefficients across various frequencies of a micro-perforated panel arrangement with various micro-perforation diameters according to embodiments are shown. In each case, the predicted sound absorption coefficient across a frequency range is shown for 0.5 mm thick micro-perforated glass with various micro-perforation/hole sizes at a constant hole spacing of 1.7 mm. Specifically, panels having micro-perforation diameters of 200 µm, 500 µm, and both 200 µm and 500 µm, respectively, are depicted. As shown, a glass panel with varying hole sizes can have enhanced acoustic performance compared to a single hole size due in part to the principle of superposition as applied to acoustic and structural panel modes.

Double Pane

In some embodiments, two Acoustic Management Glass (AMG) panels (glass or glass ceramic with micro-features) are separated by an airspace (<2 inches) to achieved the desired broadband acoustic absorption (NRC>0.5) and break safe criteria outlined in ANSI 97.1. Note that higher air spacing (>2 inches) can also be incorporated if desired. In some embodiments, the panels are tempered.

Two or more tempered AMG panels (>0.7 mm thickness) may be arranged in parallel separated by an airspace (typically less than 50 mm) to achieve the desired acoustics. The AMG panels can be physically connected to each other using fixtures or can be physically isolated from each other by simply hanging them in front of each other as a screen. Two AMG panels may be used in parallel with or without a solid back wall (see FIGS. 17 and 18). The hole features can be designed to be the same in both panels or different.

Figure 16:
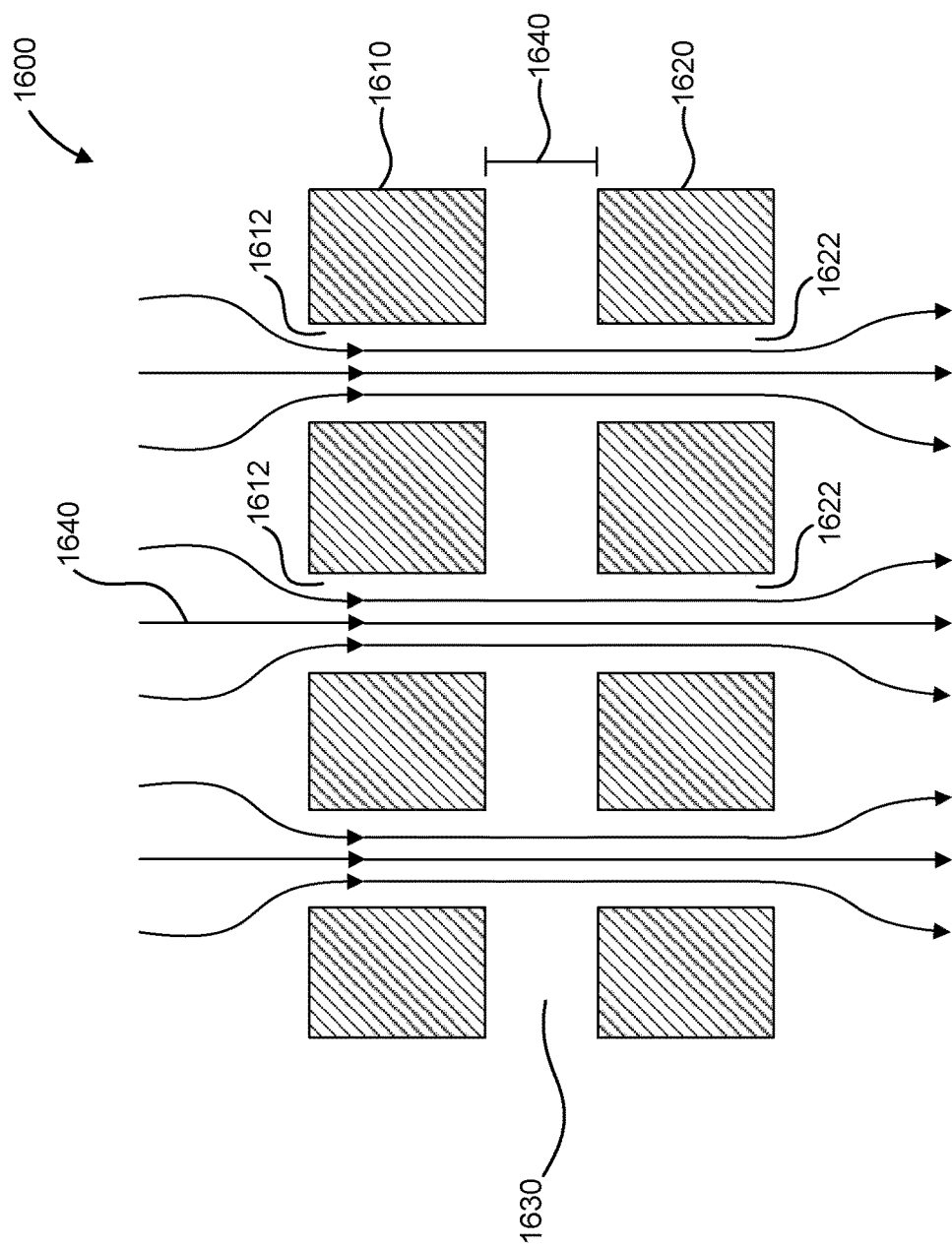
FIG. 16 shows a multi-panel structure according to an embodiment.

FIG. 16 shows a multi-panel structure 1600 comprising two panels separated by an intra-panel gap. A first panel 1610 is separated from a second panel 1620 by intra-panel gap 1630. Separation distance 1640 is the distance through intra-panel gap 1630 that separates first panel 1610 from second panel 1620. First panel 1610 has a plurality of holes 1612 therein. Second panel 1620 has a plurality of holes 1622 therein. Arrows 1640 illustrate airflow through first panel 1610 and second panel 1620.

The separation distance between panels, such as the separation distance 1640 between first panel 1610 and second panel 1620 through intra-panel gap 1630, may have a variety of different values. For example, the separation distance may be 1 mm, 5 mm, 10 mm, 20 mm, 30 mm, 40 mm, 50 mm, 60 mm, 70 mm, 80 mm, 90 mm, 100 mm, 150 mm, 200 mm, 300 mm, or any range having any two of these values as endpoints. In some embodiments, the intra-panel gap may be between about 1 mm and 500 mm, between about 1 mm and 100 mm, between about 1 mm and 50 mm. Larger or smaller separation distances may be used. Different separation distances may lead to different acoustic properties for the same multi-panel structure. So, the separation distance may be used to tune the acoustic performance of a multi-panel structure.

A multi-panel structure may be used with or without a back wall.

Figure 26:
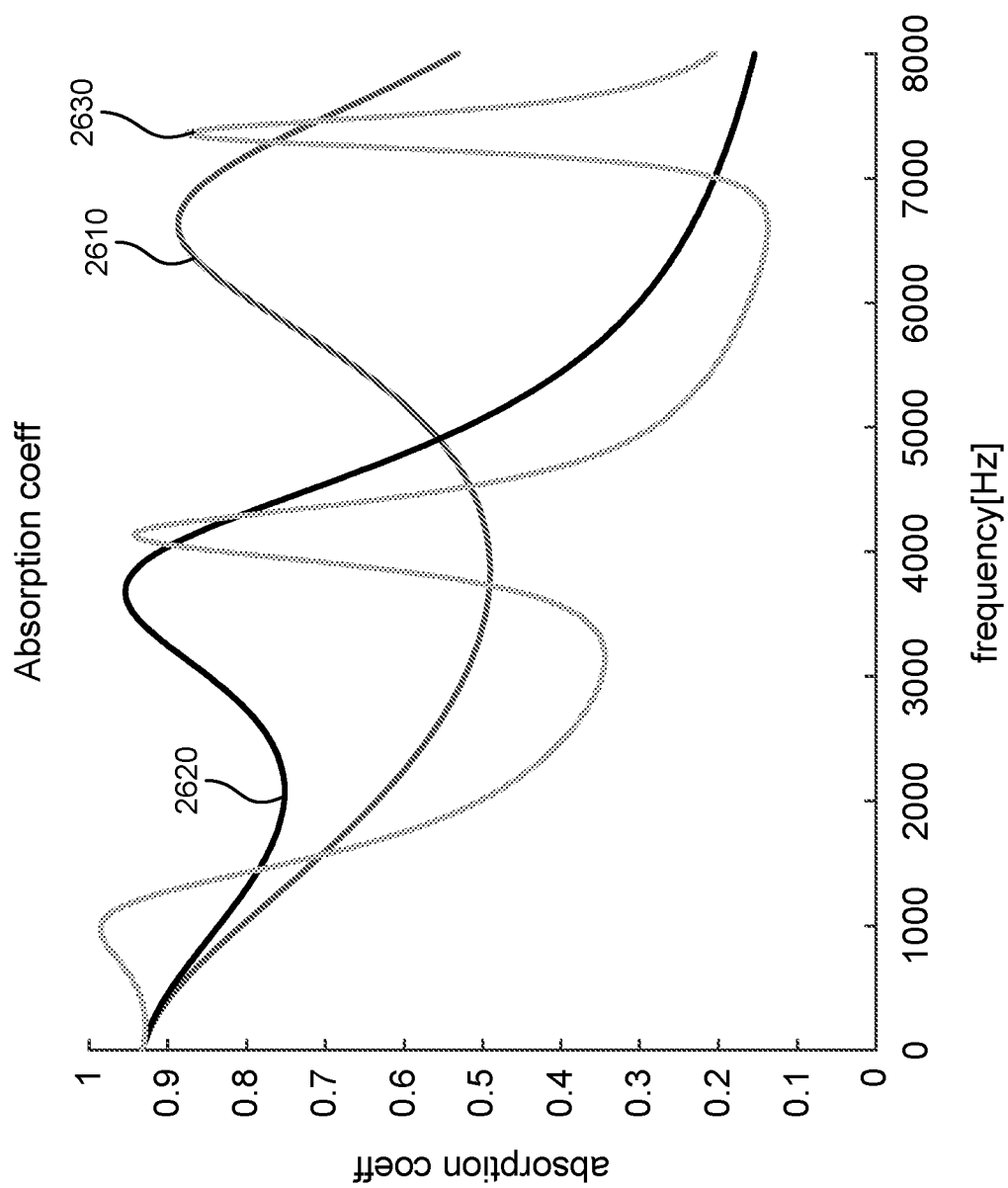
FIG. 26 shows sound absorption profiles for a double panel structure, without a back wall, for various intra-panel gaps.

FIG. 26 shows sound absorption profiles for a double panel structure, without a back wall, for various intra-panel gaps. Line 2610 corresponds to a 4 mm intra-panel gap. Line 2620 corresponds to a 10 mm intra-panel gap. Line 2630 corresponds to a 50 mm intra-panel gap.

Theoretical acoustic models were developed based on Sakagami's equations.

In this design, the two panels had a hole diameter of 300 um with a hole spacing of 1200 um in 1000 um thick panels. Both the panels in this design had the same dimensions. An intra-panel gap of 50 mm, 10 mm and 4 mm correspond to lines 2630, 2620 and 2610, respectively.

While FIG. 16 illustrates only two panels, a larger number of panels may be used. A larger number of panels is expected to result in better absorption of sound. But, a larger number of panels also costs more.

Double Panel Structure With Back Wall

Figure 17:
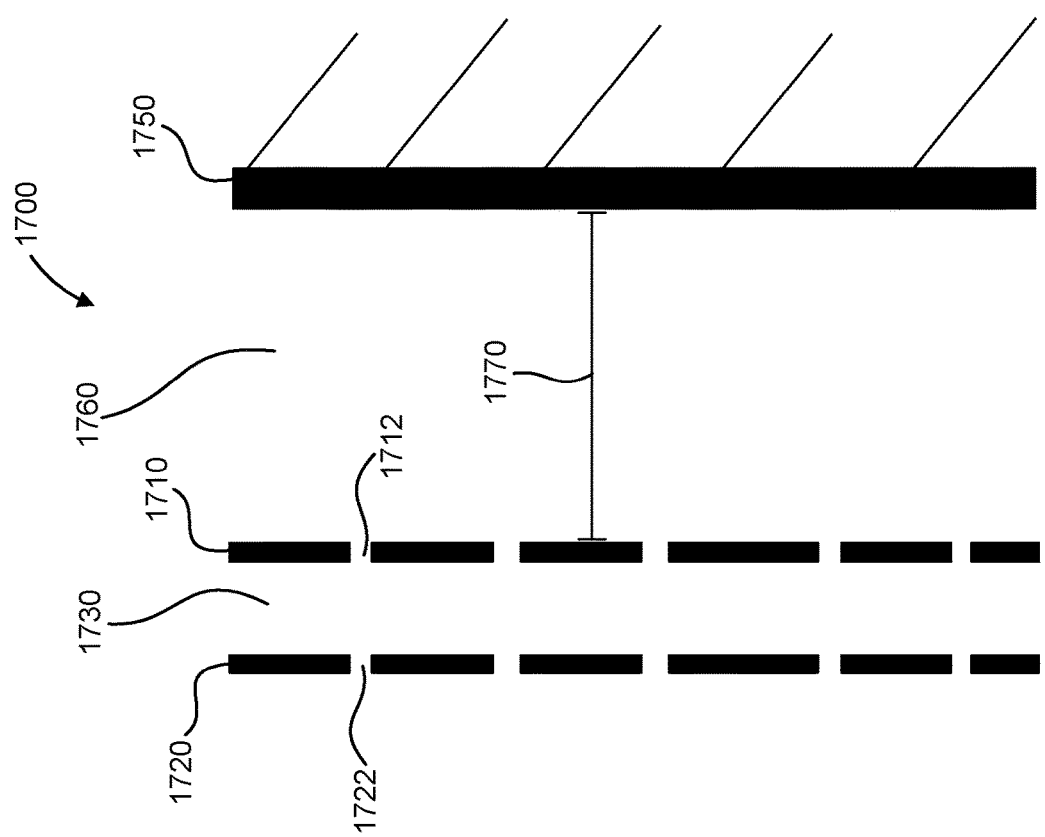
FIG. 17 shows a multi-panel structure positioned near a back wall according to an embodiment.

FIG. 17 shows a multi-panel structure 1700, specifically a double-panel structure. Multi-panel structure 1700 comprises a first panel 1710 is separated from a second panel 1720 by intra-panel gap 1730. First panel 1710 has a plurality of holes 1712 therein. Second panel 1720 has a plurality of holes 1722 therein. First panel 1710 is separated from a wall 1750 by a wall-panel gap 1760 that defines a separation distance 1770.

The separation distance defined by a wall-panel gap may be 25 mm, 50 mm, 75 mm, 100 mm, 125 mm, 150 mm, 175 mm, 200 mm, 225 mm, 250 mm, 275 mm, 300 mm, 400 mm, 500 mm, 600 mm, 700 mm, 800 mm, 900 mm, 1000 mm (1 meter), or any range having any two of these values as endpoints. For wall-panel gaps above 1 meter, it is believed that the presence of the wall has a minor effect on acoustic properties, as discussed below with respect to double panes without a back wall.

Double Panel Structure Without Back Wall

Figure 18:
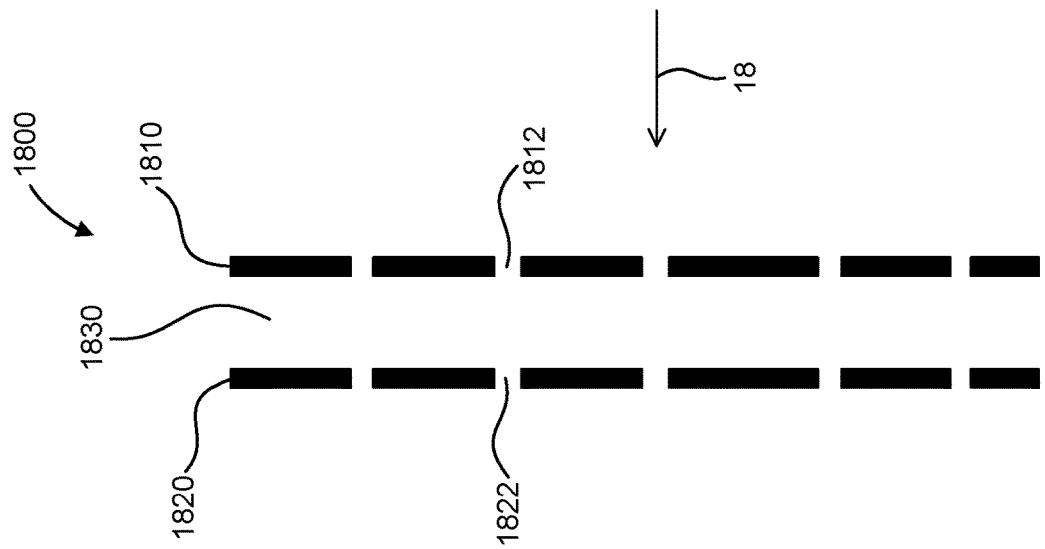
FIG. 18 shows a multi-panel structure not positioned near a back wall according to an embodiment.

FIG. 18 shows a multi-panel structure 1800, specifically a double-panel structure. Multi-panel structure 1800 comprises a first panel 1810 is separated from a second panel 1820 by intra-panel gap 1830. First panel 1810 has a plurality of holes 1812 therein. Second panel 1820 has a plurality of holes 1822 therein. Multi-panel structure 1800 is placed more than 12 inches from a wall that is parallel to first panel 1810.

A multi-panel structure without a back wall may be used to achieve high acoustic absorption and low reverberation time with a lower number of total panels (double-panel instead of triple-panel or more), and with a lower total panel surface area (the area of wall or space covered by the multi-panel structure), compared to a multi-panel structure with a back wall. Fewer panels and lower panel surface area reduces the total cost for the end user/customers.

Figure 20:
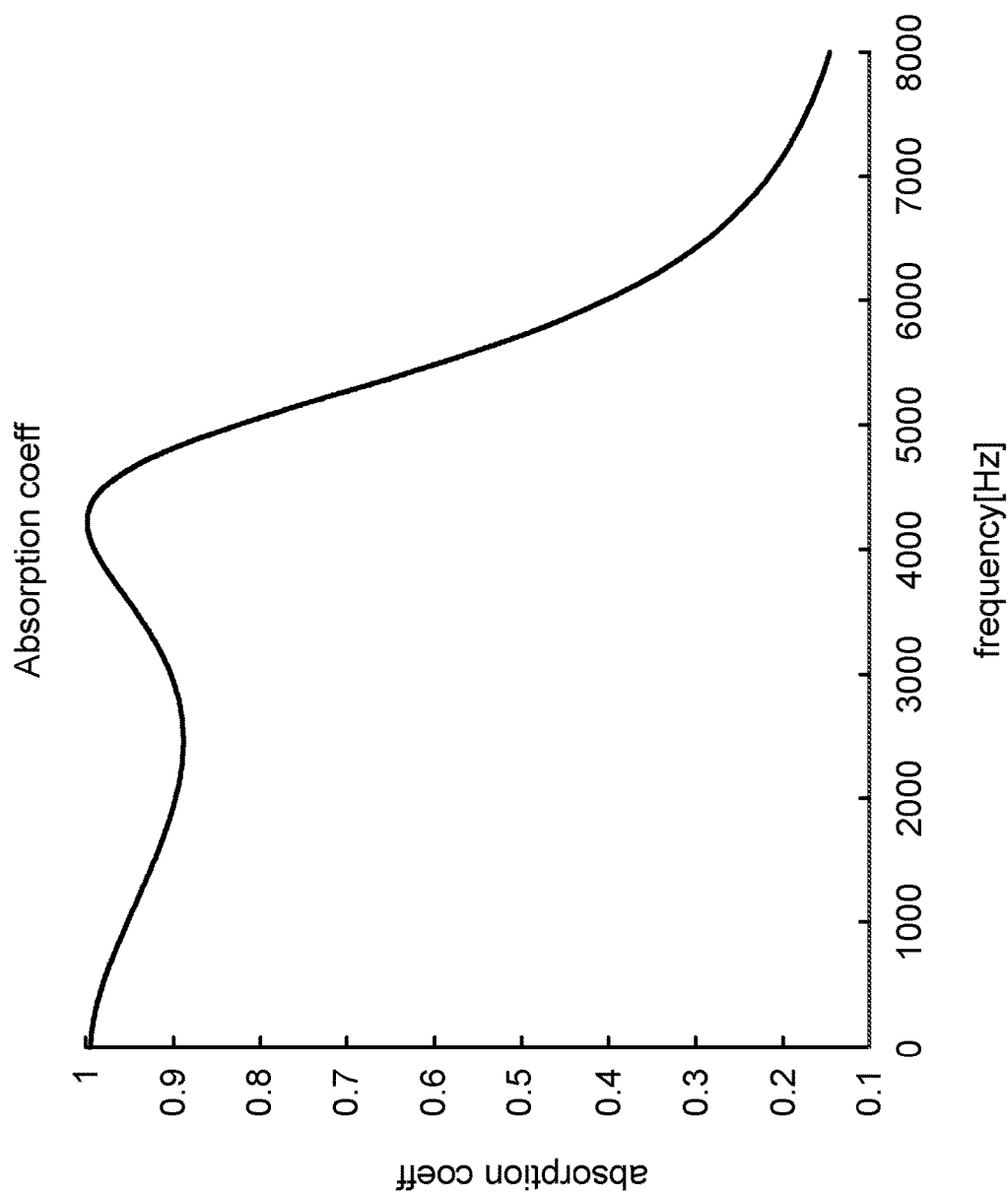
FIG. 20 shows a graph of modeled acoustic absorption coefficient v. frequency for a multi-panel structure without a back wall.

FIG. 20 shows a graph of modeled acoustic absorption coefficient v. frequency for a multi-panel structure without a back wall. The model data of FIG. 20 is based on a double panel arrangement without a back wall designed to achieve a high broad band acoustic absorption in the speech frequencies (500-5000 Hz). The design consists of two glass panels each with a hole size of 500 um and spacing of 1 mm in a panel with thickness of 2.5 mm and separated by an airspace of 10 mm. As can be noted such a design would be advantageous for acoustic applications where speech frequencies need to be reduced. This structure resulted in a modeled resulted in a NRC>0.5, and Aw>0.4.

Unless otherwise specified, modeled acoustic data described herein was obtained based on the models described in K. Sakagami, T. Nakamori, M. Morimoto and M. Yairi, "Double-leaf microperforated panel space absorbers: A revised theory and detailed analysis," Applied Acoustics, pp. 703-709, 2009.

Comparison Showing Effect of Back Wall

Wideband acoustic absorption with a small intra-panel gap (50 mm or less) is more readily achieved with a multi-panel structure not having a back wall, such as that of FIG. 18. With a multi-panel structure having a back wall, such as that of FIG. 17, it may be more difficult to achieve wideband acoustic absorption, unless the separation distance is equal or greater than 50 mm (2 in).

Figure 19:
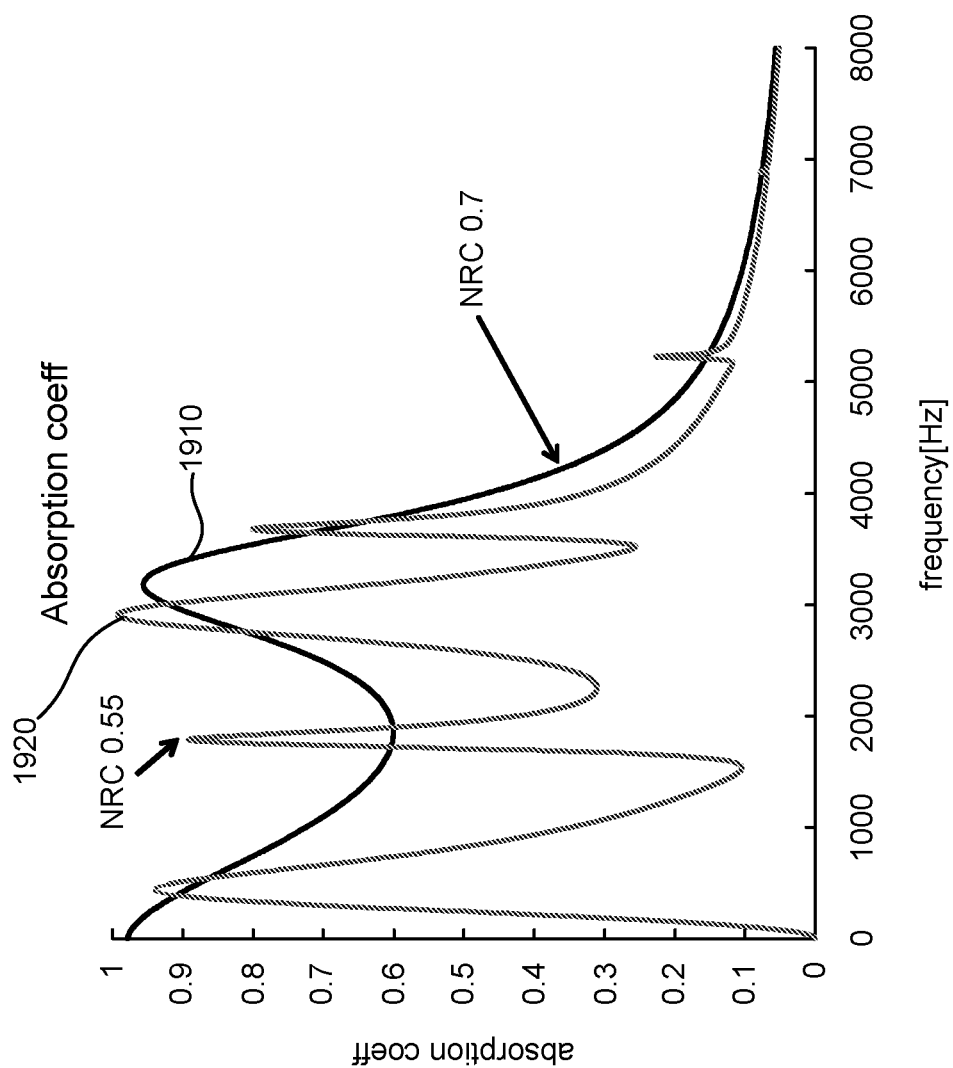
FIG. 19 shows the modeled acoustic performance of a multi-panel structure with and without a back wall.

FIG. 19 shows the modeled acoustic performance of a multi-panel structure with and without a back wall. Line 1910 shows the acoustic absorption of a double-panel structure not having a back wall, resulting in an NRC of 0.7. Line 1920 shows the acoustic absorption of a double-panel structure having a back wall, resulting in an NRC of 0.55. The panels were modeled with a hole size of 500 um with a spacing of 1.5 mm in a 2.5 mm thick glass panel separated with an intra-panel separation distance of only 10 mm (~0.4 in). The only difference between the two structures is the presence of a back wall for the multi-panel structure with a back wall, separated from the double panel structure by a wall-panel gap having a separation distance of 4 in. FIG. 19 illustrates superior performance by a multi-panel structure without a back wall.

FIG. 19 shows that the presence of a back wall results in resonance, which leads to sharper peaks and valleys in the absorption coefficient as a function of frequency. This resonance may become less pronounced as the wall-panel gap increases. For wall-panel gaps of 1 m and greater, this resonance may become minimal. So, while any double panel structure disposed within a room having walls is some distance from a wall, double panel structures that are more than 1 m from a parallel wall may be considered as not having a back wall. Where a back wall is present, it is possible to compensate for the resonance to some degree by adjusting other parameters, such as intra-panel spacing, which reduces the peaks and valleys in the absorption coefficient as a function of frequency.

In the US, the acoustic performance of a product is measured by its NRC (Noise reduction coefficient). High NRC indicates high acoustic performance. The NRC is average sound absorption at 250 Hz, 500 Hz, 1000 Hz and 2000 Hz.

Hole Alignment

In some embodiments, hole alignment or lack thereof may be used to adjust acoustic properties. In some embodiments, holes on a first panel in a multi-panel structure may be aligned with holes in a second panel. In some embodiments, holes on a first panel in a multi-panel structure may be mis-aligned with holes in a second panel. Holes on the first and second panels do not need to be perfectly aligned to achieve high acoustic absorption. They can be intentionally aligned or misaligned and still achieve good absorption. This ability to misalign provides extra flexibility during installation, which may reduce installation time and cost.

Intentional misalignment may be used to create a torturous acoustic path and enhance absorption in specific acoustic frequencies as opposed to a wide range of frequencies.

Figure 21:
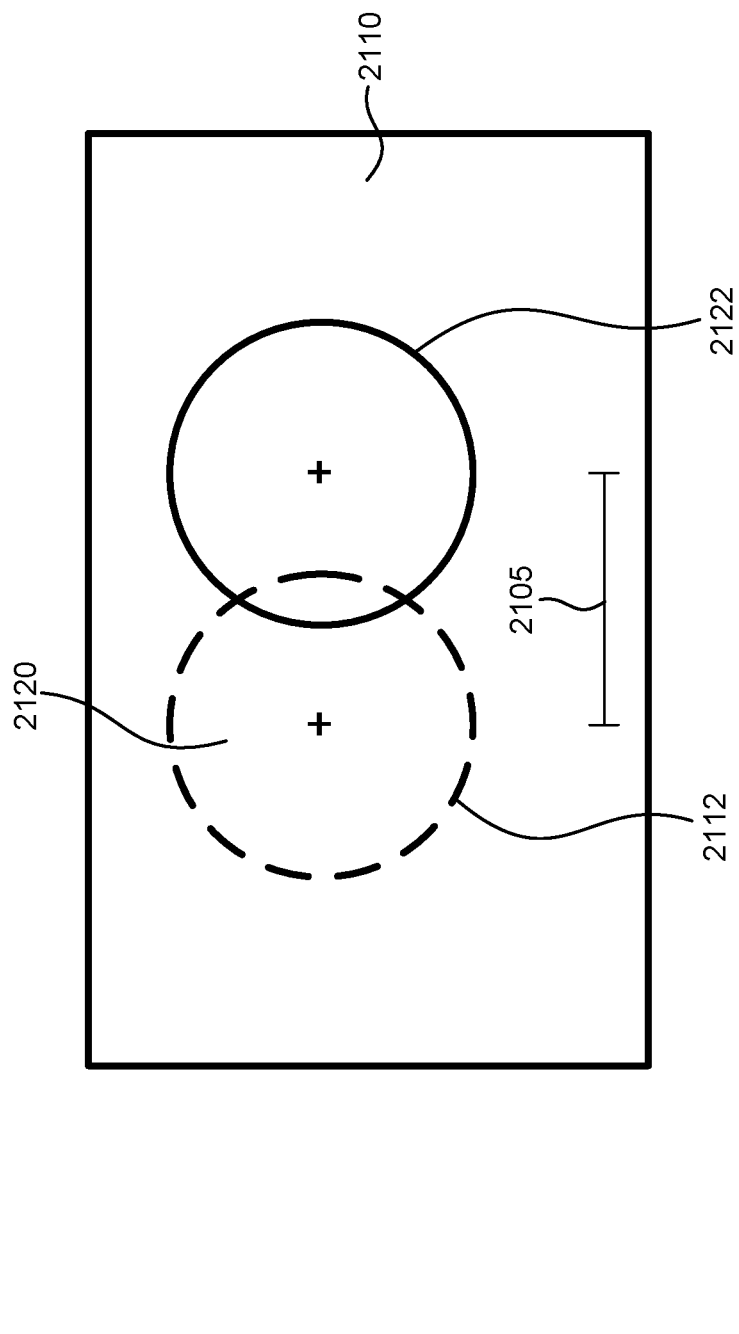
FIG. 21 shows a double panel structure 2100 with misaligned holes according to an embodiment.

FIG. 21 shows a double panel structure 2100 with misaligned holes. Double panel structure 2100 is viewed from a direction perpendicular to the surface of panel 2110. While double panel structure 2100 is not necessarily exactly the same as double panel structure 1800, both double panel structure 2100 and double panel structure 1800 are double panel structures. Bearing this similarity in mind, arrow 21 in FIG. 18 shows the direction from which double panel structure 2100 is viewed.

First panel 2110 of double panel structure 2100 has a hole 2112 therein.

Second panel 2120 has a hole 2122 therein. Second panel 2120 is disposed under first panel 2110, and is directly visible only through hole 2112. The center of hole 2122 is offset from the center of hole 2112 by offset distance 2105.

As used herein, the alignment of two holes may be quantified by determining as a percentage the ratio of the offset distance to the diameter of the larger hole. So, for FIG. 21, offset distance 2105 is 120% of the diameter of hole 2112, or hole 2122, as both holes have the same diameter in FIG. 21. In this case, the distance between the center of hole 2112 and the center of hole 2122 is 120% of the diameter of the larger of the corresponding microperforations in the first and second panels. Unless otherwise specified, the term "diameter of the larger of the corresponding microperforations" does not necessarily mean that one microperforation is larger than the other, but is rather intended to select the largest diameter present in the set of microperforations under consideration. For example, in the case where two microperforations have the same diameter, the "larger" diameter is the diameter of either microperforation.

Figure 22:
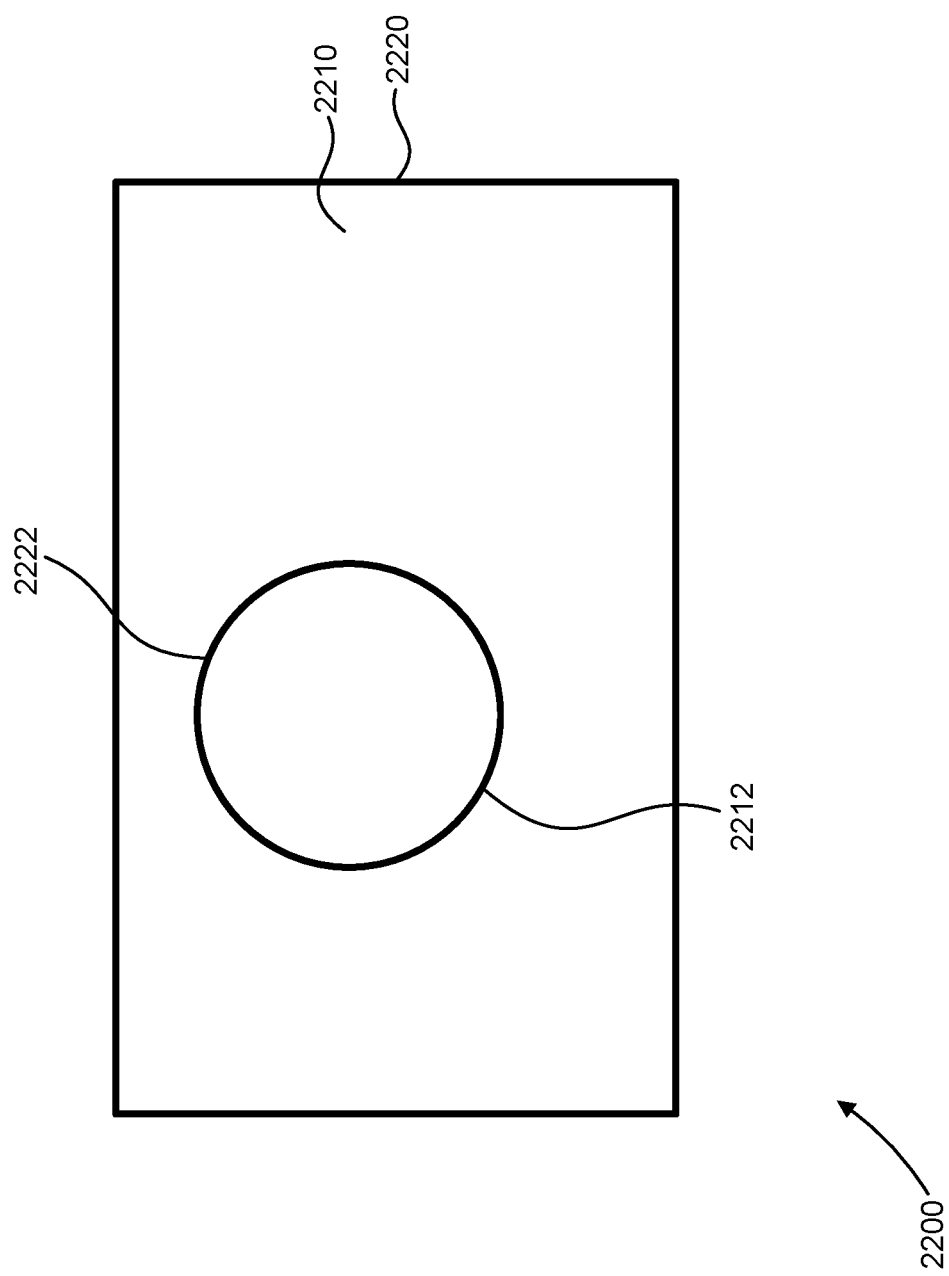
FIG. 22 shows a double panel structure 2200 having aligned holes.

FIG. 22 shows a double panel structure 2200 having aligned holes. Double panel structure 2200 is similar to double panel structure 2100 in that double panel structure 2200 has a first panel 2210 with a hole 2212 therein, and a second panel 2220 with a hole 2222 therein. In double panel structure 2200, hole 2212 is aligned exactly with hole 2222, such that second panel 2220 is directly underneath first panel 2210, and hole 2222 is directly underneath hole 2212. The offset distance between hole 2212 and hole 2222 is zero.

In some embodiments, the ratio of the offset distance to the diameter of the larger hole may be 0%, 10%, 20%, 30%, 40%, 50%, 60%, 70%, 80%, 90%, 100%, 120%, 140%, 160%, 180%, 200%, or any range having any two of these values as endpoints. Larger offsets may be used.

In some embodiments, each hole on a first panel is not necessarily aligned to a hole on a second panel to the same degree. The effect of alignment on the overall acoustic performance of the structure may be determined by the degree of alignment of most of the holes. In some embodiments, the degree of alignment of two panels may be characterized by the alignment of 70% or more, 80% or more, 90% or more, or 95% or more of the holes on the two panels. For purposes of alignment (and hole size mismatch), a hole on a first panel "corresponds" to the closest hole on the second panel. If there are different numbers of holes on two panels, some of the holes on the panel with the greater number of holes will not have a corresponding hole on the panel with the lesser number of holes, and should be excluded for purposes of characterizing the degree of alignment (and hole size mismatch) of two panels.

Holes (or microperforations) on two glass or glass ceramic panels may be considered aligned when, for 70% or more, 80% or more, or 90% or more of the microperforations of the first glass or glass ceramic panel, each microperforation is aligned with a corresponding microperforation of the second glass or glass ceramic panel such that the distance between the center of the first microperforation and the center of the second microperforation is 20% or less, 15% or less, or 10% or less than the diameter of the larger of the corresponding microperforations in the first and second glass or glass ceramic panels.

Holes (or microperforations) on two glass or glass ceramic panels may be considered misaligned when, for 70% or more, 80% or more, or 90% or more of the microperforations of the first glass or glass ceramic panel, each microperforation is aligned with a corresponding microperforation of the second glass or glass ceramic panel such that the distance between the center of the first microperforation and the center of the second microperforation is 20% or more, 50% or more, or 100% or more than the diameter of the larger of the corresponding microperforations in the first and second glass or glass ceramic panels.

Figure 23:
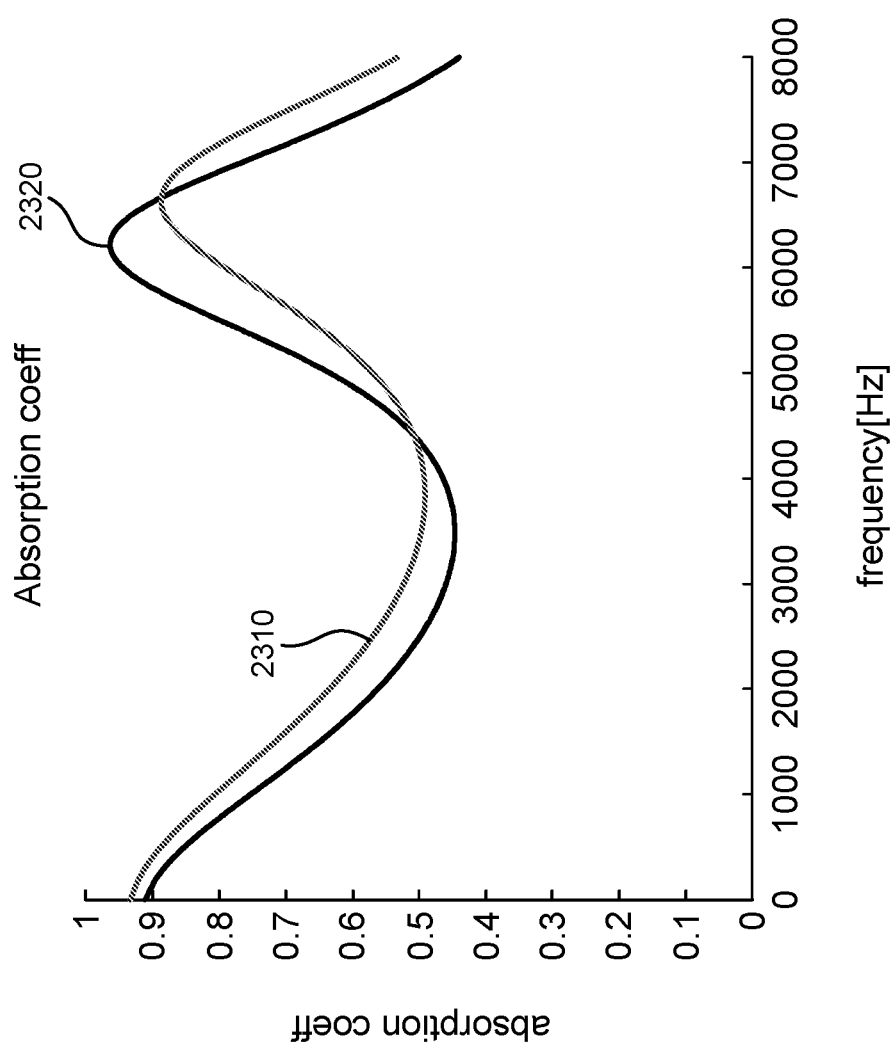
FIG. 23 shows sound absorption profiles that illustrate the effect of alignment vs. misalignment of holes between different panels in a multi-panel structure.

FIG. 23 shows sound absorption profiles that illustrate the effect of alignment vs. misalignment of holes between the panels. Line 2310 shows the acoustic coefficient of two panels having aligned holes. Line 2320 shows the acoustic coefficient of two panels having mis-aligned holes. In the example of FIG. 23, intentionally misaligning the holes has a positive impact in the 5000-7000 Hz range while aligning the holes has a positive impact in the 0-4000 Hz range. Thus, depending on the application, it may be desirable to intentionally align or misalign the holes.

The data of FIG. 23 was generated using the following double panel structures. For line 2310, a double panel structure similar to that of FIG. 22 (aligned holes) was used.

The hole sizes were 300 um with a spacing of 1200 um in a 1000 um thick panel. For line 2320, a double panel structure similar to that of FIG. 21 (misaligned holes) was used. The size and spacing of the holes was the same as that for line 2310. But, the holes in the first panel had an offset distance of 200 um from the holes in the second panel.

Hole Size Mismatch

In some embodiments, a match or mismatch in the size of holes on different panels may be used to adjust acoustic properties. In some embodiments, holes on a first panel in a multi-panel structure may be the same size as holes in a second panel. In some embodiments, holes on a first panel in a multi-panel structure may have a size that is different from that of holes in a second panel.

Figure 24:
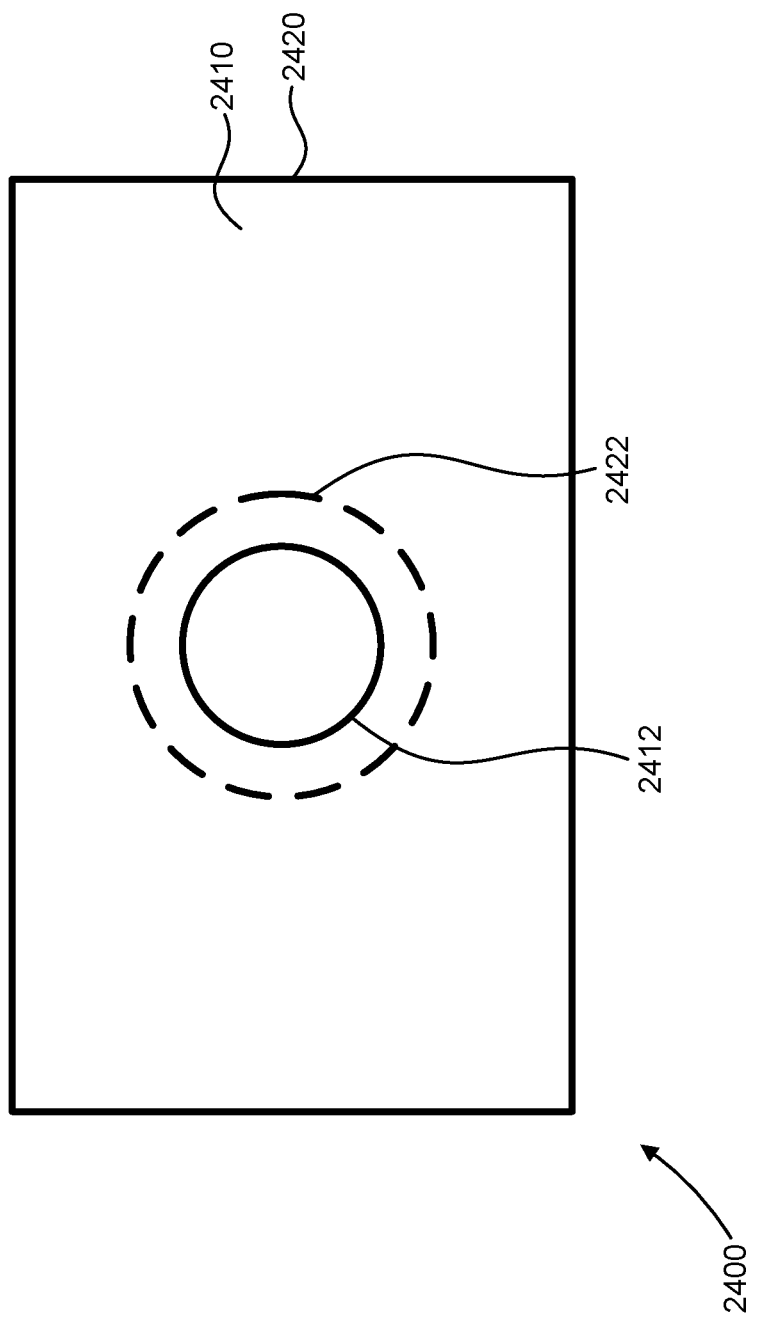
FIG. 24 shows a double panel structure 2400 having mismatched hole sizes.

FIG. 24 shows a double panel structure 2400 having mismatched hole sizes.

Double panel structure 2400 is viewed from a direction perpendicular to the surface of panel 2410. While double panel structure 2400 is not necessarily exactly the same as double panel structure 1800, both double panel structure 2400 and double panel structure 1800 are double panel structures. Bearing this similarity in mind, arrow 21 in FIG. 18 shows the direction from which double panel structure 2400 is viewed.

First panel 2410 of double panel structure 2400 has a hole 2412 therein.

Second panel 2420 has a hole 2422 therein. As illustrated, hole 2422 is larger than hole 2412. Second panel 2420 is disposed under first panel 2410, and is not directly visible.

As used herein, the size mismatch of two holes may be quantified by determining, as a percentage, the difference between the sizes of the two holes. Unless otherwise specified, the percentage should be calculated by comparing the difference in size to the size of the larger hole. So, for FIG. 24, the mismatch would be the difference in the sizes of hole 2412 and 2422, divided by the size of hole 2422, which is the larger hole.

In some embodiments, the size mismatch between holes on a first panel and holes on a second panel may be 0%, 10%, 20%, 30%, 40%, 50%, 60%, 70%, 80%, 90%, or 100%, or any range having any two of these values as endpoints. Larger size mismatches may be used.

In some embodiments, every hole on a first panel is not necessarily the same size, and every hole on a second panel is not necessarily the same size, and the size mismatch between each pair of corresponding holes is not necessarily the same. The effect of hole size mismatch between two panels on the overall acoustic performance of a structure may be determined by the mismatch of most of the holes. In some embodiments, the degree of hole size mismatch between two panels may be characterized by the sizes of 70% or more, 80% or more, 90% or more, or 95% or more of the holes on the two panels.

In some embodiments, most of the holes on any given panel in a structure are about the same size. Holes on a panel may be considered to be about the same size when, for the panel, there is a target panel diameter, and for 70% or more, 80% or more, 90% or more, or 95% or more of the holes on the panel, the diameter of the each hole is within 20%, 15%, 10% or 5% of the target diameter. If the criteria of most holes being about the same size is met, the target diameter is the average of the diameters of the holes that are about the same size. If there are a few holes having a significantly different diameter outside of the percentages described above, those holes should be excluded when calculating target diameter.

In some embodiments, a multi-panel structure comprises a first panel and a second panel. The first panel has a first panel target diameter. The second panel has a second panel target diameter. In some embodiments, the first panel target diameter is matched to the second panel target diameter. For example, the difference between the first panel target diameter and the second panel target diameter may be 20% or less, 15% or less, 10% or less, or 5% or less. In some embodiments, the first panel target diameter is mismatched from the second panel target diameter. For example, the difference between the first panel target diameter and the second panel target diameter may be 20% or more, 40% or more, 60% or more, 80% or more, or 100% or more.

In some embodiments, most of the holes of a double panel structure are matched in size. For example, in some embodiments, for at least 80% of the microperforations of the first glass or glass ceramic panel, the diameter of each microperforation is within 10% of a first panel target diameter. For at least 80% of the microperforations of the second glass or glass ceramic panel, the diameter of each microperforation is within 10% of a second panel target diameter. The first panel target diameter is 20% or less different from the second panel target diameter.

In some embodiments, most of the holes of a double panel structure are mismatched in size between a first panel and a second panel. For example, in some embodiments, for at least 80% of the microperforations of the first glass or glass ceramic panel, the diameter of each microperforation is within 10% of a first panel target diameter. For at least 80% of the microperforations of the second glass or glass ceramic panel, the diameter of each microperforation is within 10% of a second panel target diameter. The first panel target diameter is 20% or more different from the second panel target diameter.

In some embodiments, there may be mismatch among the holes within a panel.

Figure 25:
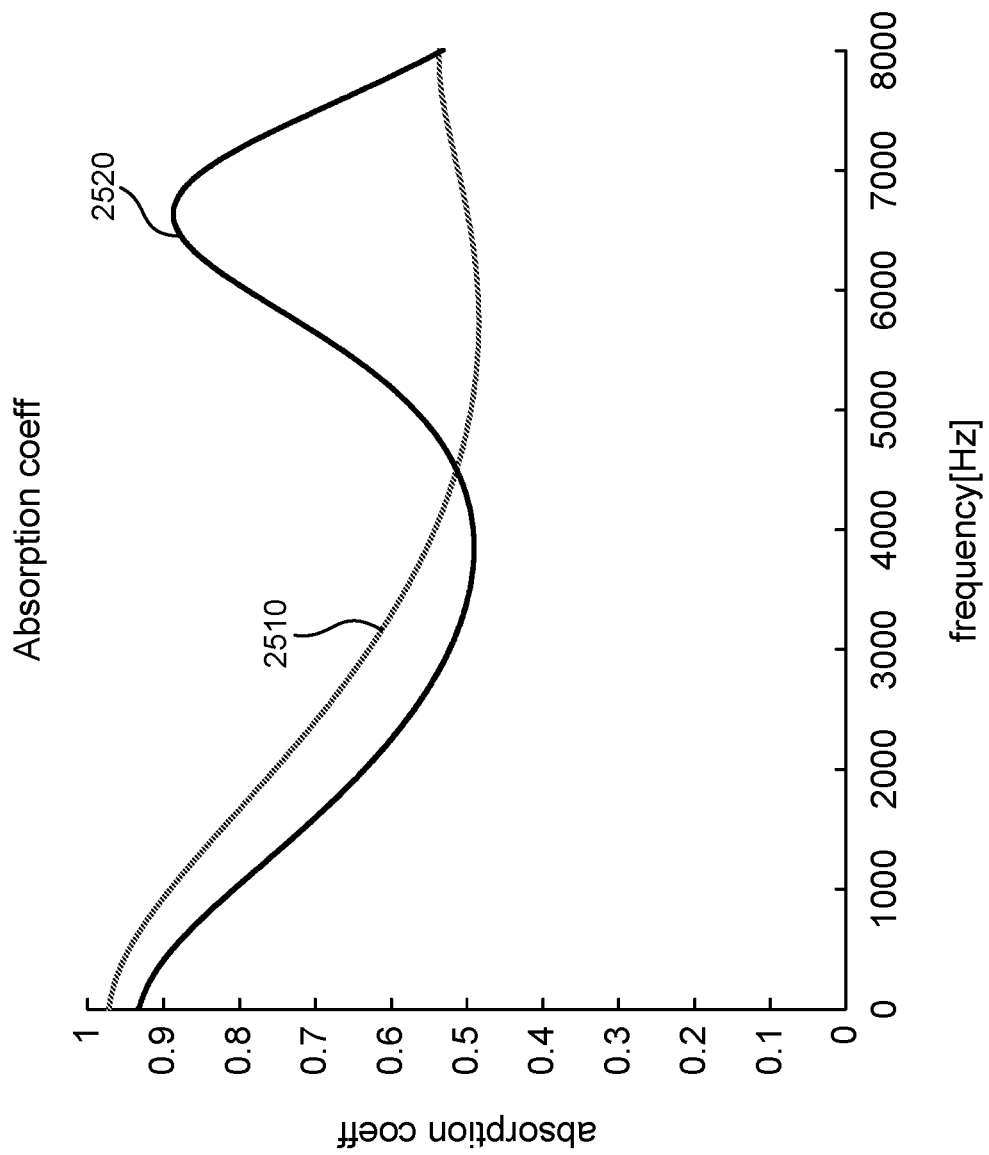
FIG. 25 shows sound absorption profiles that illustrate the effect of mismatched hole sizes between holes of different panels in a multi-panel structure.

FIG. 25 shows sound absorption profiles that illustrate the effect of mismatched hole sizes between holes of different panels in a multi panel structure. Line 2510 shows the acoustic coefficient of two panels having different sized holes. Line 2520 shows the acoustic coefficient of two panels having the same sized holes. In the example of FIG. 25, using different hole sizes has a positive impact in the 0 Hz-4500 Hz range while using the same size holes has a positive impact in the 4500 Hz-8000 Hz range. Thus, depending on the application, it may be desirable to use same or different size holes.

The data of FIG. 25 was generated using the following double panel structures. For line 2510, the first panel has a hole diameter of 300 um and the second panel has a diameter of 500 um, with hole spacing of 1200 um in both panels. The intra-panel spacing was 4 mm. For line 2520, the double panel structure was the same as for line 2510, except for the hole diameters—for line 2510, the hole diameters were 300 um in both panels.

Hole Geometry

In some embodiments, various hole or microperforation geometries may be used.

FIG. 27 shows an hourglass hole geometry 2700, and a cylindrical hole geometry 2750.

Hourglass hole geometry has a waist 2710 in the central portion of a panel, and outer portions 2720 near the surface of a panel. Waist 2710 has a diameter 2712. Outer portions 2720 have a diameter of 2722. For purposes of comparing hole sizes as described herein, the diameter of waist 2712 should be used.

Cylindrical hole geometry 2750 has the shape of a cylinder, with a diameter 2752, and a height 2754 corresponding to the thickness of the panel in which the cylindrical hole is formed.

FIG. 28 shows sound absorption profiles for an hourglass hole geometry and a cylindrical hole geometry. Line 2810 corresponds to 2 mm thick hour glass hole geometry (350-500 um entry holes with a waist of 180 um). Line 2820 corresponds to 0.5 mm thick cylindrical hole shape with 200 um diameter holes, with 1.7 mm spacing and with a back wall separation of 50 mm.

The data of FIG. 28 was generated using the following single panel structures with a back wall. For line 2820, a 0.5 mm thick panel with 200 um diameter holes and 1700 um pitch was used with a back wall spacing of 50 mm. For line 2810, a 2 mm thick panel with surface hole diameter in the range of 350-500 um and waist (narrowest width in the hole section) of 180 um was used. The hole spacing was 1000 um and distance from the rigid wall was 50 mm.

Porosity

In some embodiments, the porosity of microperforations in each of the first and second glass or glass ceramic panels is in the range 0% to 10%. "Porosity" is the area of the microperforations divided by the surface area of a surface of the glass or glass ceramic panel (including the porosity area) in which the microperforations are formed. Where the pores have a non-uniform cross section, the area at the surface of the glass or glass ceramic panel is used to calculate porosity. Where a pore is present, the porosity will be greater than zero, but may be quite low. In some embodiments, the porosity may be 0%, 1%, 2%, 3%, 4%, 5%, 6%, 7%, 8%, 9%, 10%, or any range having any two of these values as endpoints. Porosity values outside the range 0-10% may be used in some situations.

Hole Size

In some embodiments, the diameter of each of the plurality of microperforations is in the range 20 um to 500 um. The diameter of each of the microperforations may be 20 um, 40 um, 60 um, 80 um, 100 um, 150 um, 200 um, 250 um, 300 um, 350 um, 400 um, 450 um, 500 um, or any range having any two of these values as endpoints. In some situations, diameters outside of these ranges may be used.

Modeled Results

Figure 29:
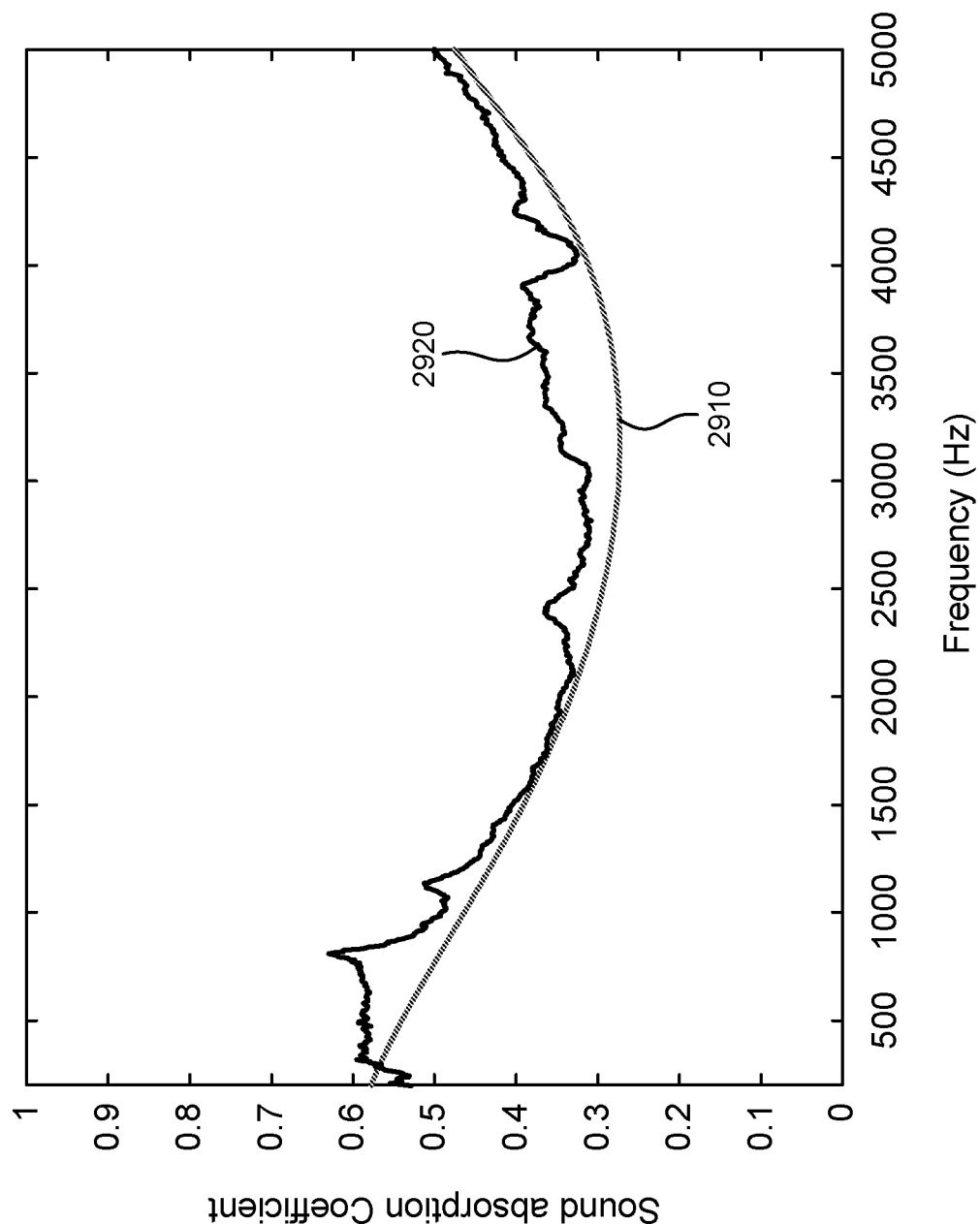
FIG. 29 shows a comparison of a modeled absorption profile to a measured absorption profile for the same double panel structure.

Unless otherwise specified, absorption profiles discussed herein are based on modeling. FIG. 29 shows a comparison of a modeled absorption profile to a measured absorption profile for the same double panel structure. Line 2910 represents modeled data. Line 2920 represents measured data. FIG. 29 validates the accuracy of the modeling used elsewhere in this application.

The data of FIG. 29 was generated using the following double panel structures. For the modeled data of line 2910, the two panels had a thickness of 0.5 mm each with a hole diameter of 170 um and spacing of 1300 um with an intra-panel spacing of 3 mm. For the measured data of line 2920, the two panels had a thickness of 480 um each with a hole diameter of 170-200 um and spacing of 1300 um with an intra-panel spacing of 2-4 mm.

Decorative Embodiments

In some embodiments, the micro-perforation design in the different panels of a multi-panel embodiment can be designed such that, when viewed in combination, the microperforations of the multiple panels combine to create a decorative pattern.

The micro-perforations can be designed to represent shapes, texts, logos, or other patterns.

In some embodiments, a multi-panel structure may take the form of cubicle furniture, vertical dividers, meeting room space absorbers, office screens, lighting fixtures, and other commonplace objects, due to the favorable optical properties, acoustics and safety attributes of the multi-panel structure.

EXAMPLE

Two glass panels (Panel 1—a chemically strengthened glass and Panel 2 a chemically strengthened glass) are micro-perforated using laser beam (e.g., a Gauss-Bessel laser beam) followed by chemical etching as described above. Each glass panels has a thickness of 500 µm. The diameter of the micro-perforation is 200 µm in 1.7 mm grid pattern. The strengths of two micro-perforated glass panels are measured, along with a non-micro-perforated glass panel (Panel 3 which is a chemically strengthened glass panel). The results (expressed as probability of failure) are summarized and shown in FIG. 14. The results indicate that Panel 2 and Panel 3 have the same (similar) strength, i.e., micro-perforation does not lead to a loss of strength of a glass panel. The strength was measured by ring-on-ring testing, which is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the test methodology described herein. The contents of ASTM C1499-09 are incorporated herein by reference in their entirety. In FIG. 14, the glass specimen is not abraded prior to ring-on-ring testing. For the ring-on-ring test, a glass or glass-ceramic panel is placed between two concentric rings of differing size to determine equibiaxial flexural strength (i.e., the maximum stress that a material is capable of sustaining when subjected to flexure between two concentric rings). In the test configuration, the glass or glass-ceramic panel is supported by a support ring having a diameter D2. A force is applied by a load cell to the surface of the glass or glass-ceramic panel by a loading ring having a diameter D1. The ratio of diameters of the loading ring and support ring D1/D2 may be in a range from 0.2 to 0.5. In some embodiments, D1/D2 is 0.5. Loading and support rings are aligned concentrically to within 0.5% of support ring diameter D2. The load cell used for testing should be accurate to within ±1% at any load within a selected range. Testing is carried out at a temperature of 23±2° C. and a relative humidity of 40±10%.

For fixture design, the radius r of the protruding surface of the loading ring is in a range of $h/2 \leq r \leq 3 \, h/2$, where h is the thickness of glass or glass-ceramic panel. Loading and support rings are made of hardened steel with hardness HRc>40. Ring-on-ring testing fixtures are commercially available. The intended failure mechanism for the test is to observe fracture of the glass or glass ceramic panel originating from the surface within the loading ring. Failures that occur outside of this region—i.e., between the loading ring and support ring—are omitted from data analysis. Due to the thinness and strength of the glass or glass-ceramic panels, however, large deflections that exceed ½ of the specimen thickness h are sometimes observed. It is therefore not uncommon to observe a high percentage of failures originating from underneath the loading ring. Stress cannot be accurately calculated without knowledge of stress development both inside and under the ring (collected via strain gauge analysis) and the origin of failure in each specimen Ring-on-ring testing therefore focuses on peak load at failure as the measured response. The strength of glass-based article depends on the presence of surface flaws. However, the likelihood of a flaw of a given size being present cannot be precisely predicted, as the strength of glass is statistical in nature. A probability distribution can therefore be used as a statistical representation of the data obtained.

Aspect (1) of this disclosure pertains to an article, comprising: a glass or glass ceramic panel and having a thickness; wherein the panel has a plurality of micro-perforations having a diameter; and wherein the ratio of the thickness of the panel to the diameter of the micro-perforations is less than 25, or between about 0.1 and 20.

Aspect (2) of this disclosure pertains to the article of Aspect (1), wherein the thickness is between about 0.05 mm and 6 mm, or between about 0.1 mm and 3 mm.

Aspect (3) of this disclosure pertains to the article of Aspect (1) or Aspect (2), wherein the ratio of the thickness of the panel to the diameter of the micro-perforations is between about 2 and 8, or between about 3 and 6.

Aspect (4) of this disclosure pertains to the article of any one of Aspects (1) through (3), wherein the panel comprises a strengthened glass or glass ceramic.

Aspect (5) of this disclosure pertains to the article of Aspect (4), wherein the strengthened glass or glass ceramic is mechanically, thermally or chemically strengthened.

Aspect (6) of this disclosure pertains to the article of any one of Aspects (1) through (5), wherein the panel has a Noise Reduction Coefficient (NRC) of between about 0.3 and 1, or between about 0.3 and 0.8.

Aspect (7) of this disclosure pertains to the article of any one of Aspects (1) through (6), wherein the panel having a predetermined sound absorption coefficient over a predetermined frequency band between 250 Hz and 6000 Hz, or between 250 Hz and 20,000 Hz.

Aspect (8) of this disclosure pertains to the article of any one of Aspects (1) through (7), wherein a portion of an edge of the panel is sealed to a holding portion.

Aspect (9) of this disclosure pertains to the article of any one of Aspects (1) through (8), further comprising a backing wall operatively connected to the panel.

Aspect (10) of this disclosure pertains to the article of any one of Aspects (1) through (9), wherein the micro-perforations are positioned at uniform or non-uniform intervals along the panel and have uniform or non-uniform size.

Aspect (11) of this disclosure pertains to the article of any one of Aspects (1) through (10), wherein the micro-perforations are distributed with uniform or non-uniform density along the panel.

Aspect (12) of this disclosure pertains to the article of any one of Aspects (1) through (11), wherein an opening of a plurality of the micro-perforations are non-circular.

Aspect (13) of this disclosure pertains to an article comprising: a first and second glass or glass ceramic panels having a thickness, and each having a plurality of micro-perforations having a diameter; wherein the ratio of the thickness of the panels to the diameter of the micro-perforations is less than 25, or between about 0.1 and 20.

Aspect (14) of this disclosure pertains to the article of Aspect (13), wherein the first and second panels are spaced from each other by an intra-panel gap that defines a separation distance.

Aspect (15) of this disclosure pertains to the article of Aspect (13) or Aspect (14), wherein the first and second panels are generally parallel to each other.

Aspect (16) of this disclosure pertains to the article of any one of Aspects (13) through (15), wherein the article is thermally strengthened.

Aspect (17) of this disclosure pertains to the article of any one of Aspects (13) through (16), wherein the first and second panels are positioned such that there is no solid back wall within 1 m of the first and second panels that is generally parallel to the first panel or the second panel.

Aspect (18) of this disclosure pertains to the article of any one of Aspects (13) through (17), wherein the first and second panels are positioned such that there is a solid back wall within 1 m of the first and second panels that is generally parallel to the first panel or the second panel.

Aspect (19) of this disclosure pertains to the article of any one of Aspects (13) through (18), wherein: for at least 80% of the microperforations of the first glass or glass ceramic panel, each microperforation is positioned with respect to a corresponding microperforation of the second glass or glass ceramic panel such that the distance between the center of the first microperforation and the center of the second microperforation is 20% or less than the diameter of the larger of the corresponding microperforations in the first and second glass or glass ceramic panels.

Aspect (20) of this disclosure pertains to the article of any one of Aspects (13) through (19), wherein: for at least 80% of the microperforations of the first glass or glass ceramic panel, each microperforation is positioned with respect to a corresponding microperforation of the second glass or glass ceramic panel such that the distance between the center of the first microperforation and the center of the second microperforation is 20% or more than the diameter of the larger of the corresponding microperforations in the first and second glass or glass ceramic panels.

Aspect (21) of this disclosure pertains to the article of any one of Aspects (13) through (20), wherein: for at least 80% of the microperforations of the first glass or glass ceramic panel, the diameter of each microperforation is within 10% of a first panel target diameter; for at least 80% of the microperforations of the second glass or glass ceramic panel, the diameter of each microperforation is within 10% of a second panel target diameter; and the first panel target diameter is 20% or less different from the second panel target diameter.

Aspect (22) of this disclosure pertains to the article of any one of Aspects (13) through (21), wherein: for at least 80% of the microperforations of the first glass or glass ceramic panel, the diameter of each microperforation is within 10% of a first panel target diameter; for at least 80% of the microperforations of the second glass or glass ceramic panel, the diameter of each microperforation is within 10% of a second panel target diameter; and the first panel target diameter is 20% or more different from the second panel target diameter.

Aspect (23) of this disclosure pertains to the article of any one of Aspects (13) through (22), wherein the NRC of the article is 0.5 or greater.

Aspect (24) of this disclosure pertains to the article of any one of Aspects (13) through (23), wherein the porosity of microperforations in each of the first and second glass or glass ceramic panels is in the range 0% to 10%.

Aspect (25) of this disclosure pertains to the article of any one of Aspects (13) through (24), wherein the diameter of each of the plurality of microperforations is in the range 20 um to 500 um.

Aspect (26) of this disclosure pertains to a method of forming micro-perforations in a glass or glass ceramic panel, comprising: (i) forming a plurality of damage tracks into the glass or glass ceramic panel by a laser beam, wherein the panel extends in a plane and has a thickness, and wherein the damage tracks have a first diameter; and (ii) etching the panel obtained from (i) in an acid solution to form a micro-perforated panel with micro-perforations having a second diameter, wherein the NRC of the micro-perforated panel is between about 0.3 and 1.

Aspect (27) of this disclosure pertains to the method of Aspect (26), wherein the laser beam is a pulsed laser beam having a focal line oriented along a beam propagation direction and directing the laser beam focal line into the panel.

Aspect (28) of this disclosure pertains to the method of Aspect (26) or Aspect (27), further comprising: etching the glass panel in a second acid solution that is different from the first acid solution.

Aspect (29) of this disclosure pertains to the method of any one of Aspects (26) through (28), further comprising: chemically or thermally strengthening the micro-perforated panel.

Aspect (30) of this disclosure pertains to the method of any one of Aspects (26) through (29), wherein the glass or glass ceramic panel comprises a high-strength glass or glass ceramic composition.

Aspect (31) of this disclosure pertains to the method of any one of Aspects (26) through (30), wherein the thickness of the glass or glass ceramic panel is between about 0.05 mm and 6 mm.

Aspect (32) of this disclosure pertains to a method of forming micro-perforations in a glass or glass ceramic panel, comprising: (i) forming a subset of damage tracks into the glass or glass ceramic panel by a laser beam, wherein damage tracks are positioned to form a pattern; (ii) forming plurality of damage tracks into the glass or glass ceramic panel by a laser beam, wherein the panel extends in a plane and has a thickness, and wherein the damage tracks have a first diameter; and (iii) etching the panel obtained from (ii) in an acid solution such that the subset of damage tracks merge to form a micro-perforated panel with micro-perforations having a second diameter, wherein the NRC of the micro-perforated panel is between about 0.3 and 1.

Aspect (33) of this disclosure pertains to the method of forming micro-perforations in a glass or glass ceramic panel, comprising: (i) forming a subset of damage tracks into the glass or glass ceramic panel by a laser beam, wherein damage tracks are positioned to form a peripheral pattern; (ii) forming plurality of damage tracks into the glass or glass ceramic panel by a laser beam, wherein the panel extends in a plane and has a thickness, and wherein the damage tracks have a first diameter; and (iii) etching the panel obtained from (ii) in an acid solution such that the subset of damage tracks merge to remove a section of the panel and form a micro-perforated panel with micro-perforations having a second diameter, wherein the NRC of the micro-perforated panel is between about 0.3 and 1.

Aspect (34) of this disclosure pertains to the method of Aspect (32) or Aspect (33), wherein the laser beam is a pulsed laser beam having a focal line oriented along a beam propagation direction and directing the laser beam focal line into the panel, and wherein the beam focal line is substantially perpendicular to the panel for formation of a plurality of damage tracks.

Aspect (35) of this disclosure pertains to the method of Aspect (32) or Aspect (34), wherein spacing between adjacent damage tracks is tailored to obtain desired perforation shape or size.

Aspect (36) of this disclosure pertains to the method of any one of Aspects (32) through (35), wherein the laser beam is a pulsed laser beam, the pulsed laser beam being configured to strike a location on the panel one or more times.

Aspect (37) of this disclosure pertains to a method of dampening sound, comprising: positioning an article comprising first and second glass or glass ceramic panels, such that there is no solid back wall within 12 inches of the first and second panels that is generally parallel to the first panel or the second panel; wherein each of the first and second glass or glass ceramic panels: extend in a plane; comprise a thickness, and comprise a plurality of micro-perforations having a diameter; wherein the ratio of the thickness of the panels to the diameter of the micro-perforations is less than 25, or between about 0.1 and 20.

Aspect (38) of this disclosure pertains to the method of Aspect (37), wherein the first and second glass or glass ceramic panels are thermally tempered.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims.

The Summary and Abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:
1. An article, comprising:
a first panel made of glass or glass ceramic and having a thickness;
wherein the first panel has a plurality of micro-perforations having a diameter; and wherein the ratio of the thickness of the first panel to the diameter of the micro-perforations is less than 25, or between about 0.1 and about 20, wherein the micro-perforations are positioned at non-uniform intervals along the first panel, and wherein adjacent micro-perforations are spaced apart by between about 0.05 mm and about 6 mm.

2. The article of claim 1, wherein the thickness is between about 0.05 mm and about 6 mm, or between about 0.1 mm and about 3 mm.

3. The article of claim 1, wherein the ratio of the thickness of the first panel to the diameter of the micro-perforations is between about 2 and about 8.

4. The article of claim 1, wherein the first panel has a Noise Reduction Coefficient (NRC) of between about 0.3 and about 1.

5. The article of claim 1, wherein the first panel has a predetermined sound absorption coefficient over a predetermined frequency band between 250 Hz and 20,000 Hz.

6. The article of claim 1, wherein a portion of an edge of the first panel is sealed to a holding portion.

7. The article of claim 1, further comprising a backing wall operatively connected to the first panel.

8. The article of claim 1, wherein the micro-perforations have non-uniform size.

9. The article of claim 1, wherein the micro-perforations are distributed with non-uniform density along the first panel.

10. An article, comprising:
first and second panels each having a thickness, and each having a plurality of micro-perforations each having a diameter; wherein the ratio of the thickness of each of the panels to the diameter of each of the micro-perforations is less than 25, or between about 0.1 and about 20;
wherein each panel is made of glass or glass ceramic,
wherein the micro-perforations are positioned at non-uniform intervals along the first panel, and
wherein adjacent micro-perforations in each panel are spaced apart by between about 0.05 mm and about 6 mm.

11. The article of claim 10, wherein the first and second panels are spaced from each other by an intra-panel gap that defines a separation distance.

12. The article of claim 10, wherein the first and second panels are positioned such that there is no solid back wall within 1 m of the first and second panels that is generally parallel to the first panel or the second panel.

13. The article of claim 10, wherein the first and second panels are positioned such that there is a solid back wall within 1 m of the first and second panels that is generally parallel to the first panel or the second panel.

14. The article of claim 10, wherein:
for at least 80% of the microperforations of the first panel, each microperforation is positioned with respect to a corresponding microperforation of the second panel such that there are a plurality of pairs of microperforations, wherein the distance within the planes of each panel between the center of the two microperforations in each pair of microperforations is 20% or less than the diameter of the larger of the microperforation of each pair of microperforations.

15. The article of claim 10, wherein:
for at least 80% of the microperforations of the first panel, each microperforation is positioned with respect to a corresponding microperforation of the second panel such that there are a plurality of pairs of microperforations, wherein the distance within the planes of each panel between the center of the two microperforations in each pair of microperforations is 20% or more than the diameter of the larger of the microperforation of each pair of microperforations.

16. The article of claim 10, wherein:
for at least 80% of the microperforations of the first panel, the diameter of each microperforation is within 10% of a first panel target diameter;
for at least 80% of the microperforations of the second panel, the diameter of each microperforation is within 10% of a second panel target diameter; and
the first panel target diameter is 20% or less different from the second panel target diameter.

17. The article of claim 10, wherein:
for at least 80% of the microperforations of the first panel, the diameter of each microperforation is within 10% of a first panel target diameter;
for at least 80% of the microperforations of the panel, the diameter of each microperforation is within 10% of a second panel target diameter; and
the first panel target diameter is 20% or more different from the second panel target diameter.

18. The article of claim 10, wherein the Noise Reduction Coefficient (NRC) of the article is 0.5 or greater.

19. The article of claim 10, wherein the porosity of microperforations in each of the first and second panels is in the range 0% to 10%.

20. The article of claim 10, wherein the diameter of each of the plurality of microperforations is in the range 20 um to 500 um.

* * * * *